US009912942B2

United States Patent
Pu et al.

(10) Patent No.: US 9,912,942 B2
(45) Date of Patent: Mar. 6, 2018

(54) HIGH-FREQUENCY-PASS SAMPLE ADAPTIVE OFFSET IN VIDEO CODING

(71) Applicant: QUALCOMM Incorporated, San Diego, CA (US)

(72) Inventors: Wei Pu, San Diego, CA (US); Jianle Chen, San Diego, CA (US); Krishnakanth Rapaka, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 713 days.

(21) Appl. No.: 14/139,357

(22) Filed: Dec. 23, 2013

(65) Prior Publication Data

US 2014/0185665 A1    Jul. 3, 2014

Related U.S. Application Data

(60) Provisional application No. 61/747,023, filed on Dec. 28, 2012.

(51) Int. Cl.
*H04N 19/117* (2014.01)
*H04N 19/196* (2014.01)
(Continued)

(52) U.S. Cl.
CPC ..... *H04N 19/00066* (2013.01); *H04N 19/117* (2014.11); *H04N 19/14* (2014.11);
(Continued)

(58) Field of Classification Search
CPC ............. H04N 19/00066; H04N 19/82; H04N 19/187; H04N 19/117; H04N 19/14;
(Continued)

(56) References Cited

U.S. PATENT DOCUMENTS

2008/0159404 A1* 7/2008 Hong ................... H04N 19/50
375/240.23
2009/0003718 A1* 1/2009 Liu ...................... H04N 19/176
382/238
(Continued)

FOREIGN PATENT DOCUMENTS

WO  WO 201 21 6771   * 12/2012  ......... H04N 19/0003
WO  WO 2012167712 A1 * 12/2012  ....... H04N 19/00763

OTHER PUBLICATIONS

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.
(Continued)

*Primary Examiner* — Gims Philippe
*Assistant Examiner* — Stefan Gadomski

(57) ABSTRACT

Techniques for sample adaptive offset (SAO) filtering that focus on filtering the changed region of a picture or layer (e.g., the high frequency component of video blocks of a picture or layer) are described. The techniques may be referred to as High-Frequency-Pass SAO (HSAO) filtering. In one example, a method for coding video data comprises obtaining a decoded block of video data, separating the decoded block of video data into a low-frequency component and a high-frequency component, applying an SAO filter to the high-frequency component to generate a SAO filtered high-frequency component, and combining the SAO filtered high-frequency component and the low-frequency component to generate a filtered decoded block of video data.

25 Claims, 13 Drawing Sheets

(51) Int. Cl.
H04N 19/176 (2014.01)
H04N 19/136 (2014.01)
H04N 19/14 (2014.01)
H04N 19/187 (2014.01)
H04N 19/82 (2014.01)
H04N 19/70 (2014.01)
H04N 19/33 (2014.01)
H04N 19/86 (2014.01)

(52) U.S. Cl.
CPC ........... *H04N 19/187* (2014.11); *H04N 19/82* (2014.11); *H04N 19/176* (2014.11); *H04N 19/33* (2014.11); *H04N 19/70* (2014.11); *H04N 19/86* (2014.11)

(58) Field of Classification Search
CPC ........ H04N 19/86; H04N 19/33; H04N 19/70; H04N 19/176
USPC .................................................. 375/240.02
See application file for complete search history.

(56) References Cited

U.S. PATENT DOCUMENTS

| 2012/0177107 | A1* | 7/2012 | Fu ......................... | H04N 19/61 375/240.03 |
| 2013/0055049 | A1* | 2/2013 | Murakami ......... | H03M 13/1154 714/779 |
| 2013/0083844 | A1* | 4/2013 | Chong ................... | H04N 19/86 375/240.02 |
| 2013/0094569 | A1* | 4/2013 | Chong ................. | H04N 19/176 375/240.02 |
| 2013/0259118 | A1* | 10/2013 | Fu .................... | H04N 19/00066 375/240.02 |
| 2014/0003495 | A1* | 1/2014 | Chuang .............. | H04N 19/0003 375/240.02 |
| 2014/0072033 | A1* | 3/2014 | Chuang ........... | H04N 19/00763 375/240.02 |
| 2015/0103900 | A1* | 4/2015 | Liu ........................ | H04N 19/31 375/240.12 |

OTHER PUBLICATIONS

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Dietz, et al., "Spectral Band Replication, A Novel Approach in Audio Coding", Audio Engineering Society Convention Paper, New York, NY, US, vol. 112, No. 5553, May 10, 2002 (May 10, 2002), XP009020921, 8 pp.

International Search Report and Written Opinion—PCT/US2013/077694—ISA/EPO—Mar. 3, 2014, 13 pp.

Itu-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Kim et al., "Description of scalable video coding technology proposal by LG Electronics and MediaTek (differential coding mode on)", 11th Meeting, Oct. 10-19, 2012; Shanghai, CN; (Motion Picture Expert Group or ISO/IEC JTC1/SC29/WG11), No. m26549, XP030054882, 38 pp.

Pu et al., "High Frequency Pass Inter Layer Sample Adaptive Offset Filter", 12th Meeting, Jan. 14-23, 2013; Geneva, CH; (Motion Picture Expert Group or ISO/IEC JTC1/SC29/WG11), No. m27571, XP030056138, 4 pp.

Schwarz et al., "Description of scalable video coding technology proposal by Fraunhofer HHI (Configuration B)", 11th Meeting, Oct. 10-19, 2012, Shanghai, CN; (Motion Picture Expert Group or ISO/IEC JTC1/SC29/WG11), No. m26591, XP030054924, 36 pp.

Shi et al., "Spatially Scalable Video Coding for HEVC", IEEE Transactions on Circuits and Systems for Video Technology, IEEE Service Center, Piscataway, NJ, US, vol. 22, No. 12, Dec. 1, 2012 (Dec. 1, 2012), XP011487158, ISSN: 1051-8215, DOI: 10.1109/TCSVT.2012.2223031, pp. 1813-1826.

Pu et al., "High Frequency SAO for scalable extension of HEVC", 2013 Picture Coding Symposium (PCS), Dec. 1, 2013, pp. 121-124, XP055103512, DOI: 10.1109/PCS.2013.6737698 ISBN: 978-1-47-990292-7, 4 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, pp. 193.

Wiegand et al., "WD1: Working Draft 1 of High-Efficiency Video Coding", JCTVC-C403, 3rd Meeting: Guangzhou, CN, Oct. 7-15, 2010, 137 pp.

Chen, et al., "Description of Tool Experiment B4: Inter-layer filtering," Joint Collaborative Team on Video Coding (JCT-VC) of ITU-T SG 16 Wp 3 and ISO/IEC JTC 1/SC 29/WG 11, 11th Meeting: Shanghai, CN, Oct. 10-19, 2012, Document: JCTVC-K1104, 11 pp.

Response to Written Opinion Mar. 3, 2014, from International PCT/US2013/077694, filed on Oct. 28, 2014, 5 pp.

Second Written Opinion from International PCT/US2013/077694, dated Dec. 1, 2014, 6 pp.

Response to Second Written Opinion dated Dec. 1, 2014, from International PCT/US2013/077694, filed on Jan. 30, 2015, 5 pp.

International Preliminary Report on Patentability from International PCT/US2013/077694, dated Mar. 23, 2015, 10 pp.

\* cited by examiner

SAO_EO_0

SAO_EO_1

SAO_EO_2

SAO_EO_3

FIG. 5

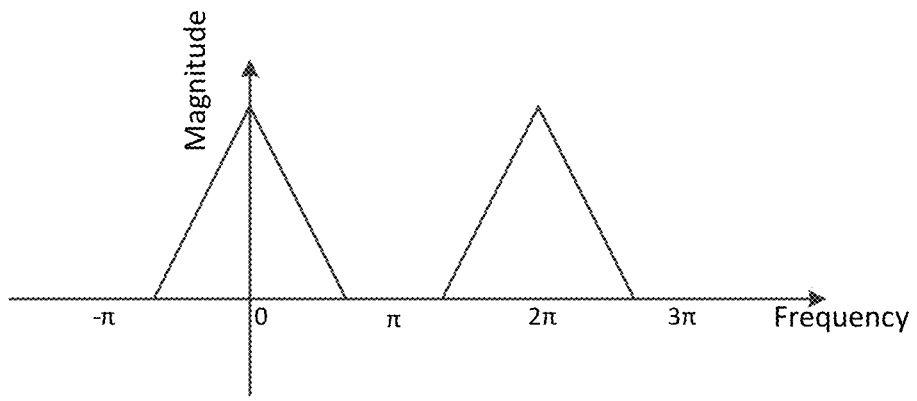
FIG. 7A: Spectrum of one original picture
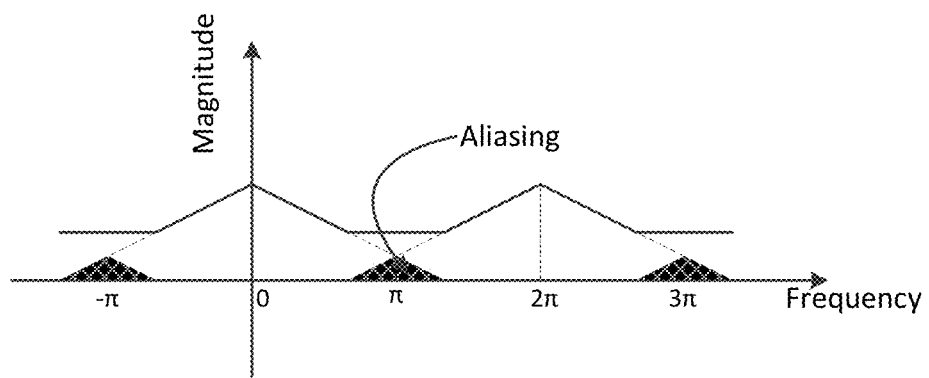
FIG. 7B: Spectrum of one base layer original picture (down-sampled from layer original picture)

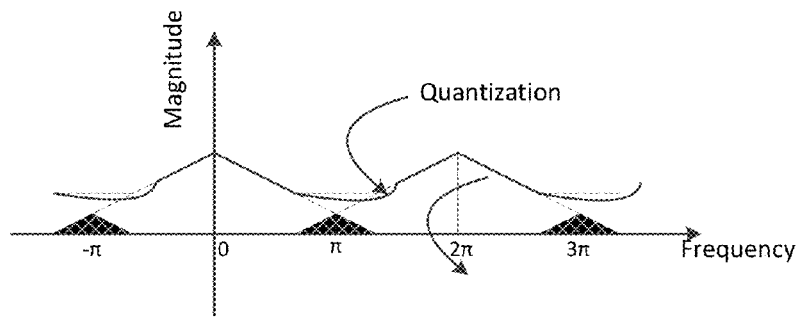
FIG. 7C: Spectrum of one de-blocked base layer reconstructed picture
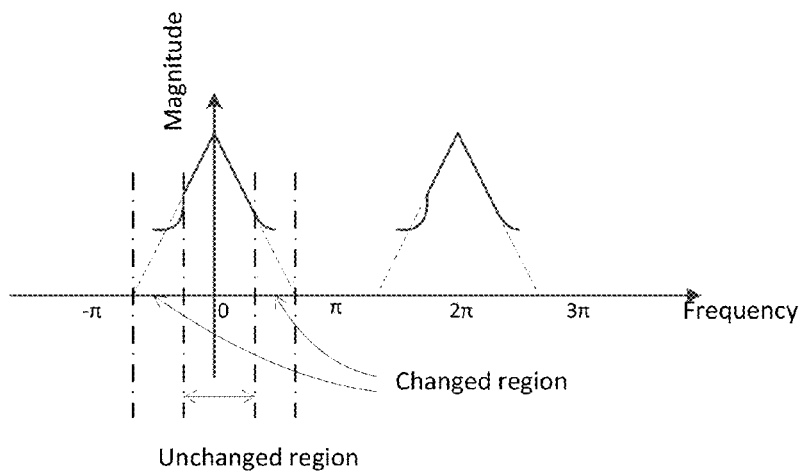
FIG. 7D: Spectrum of one up-sampled de-blocked base layer reconstructed picture

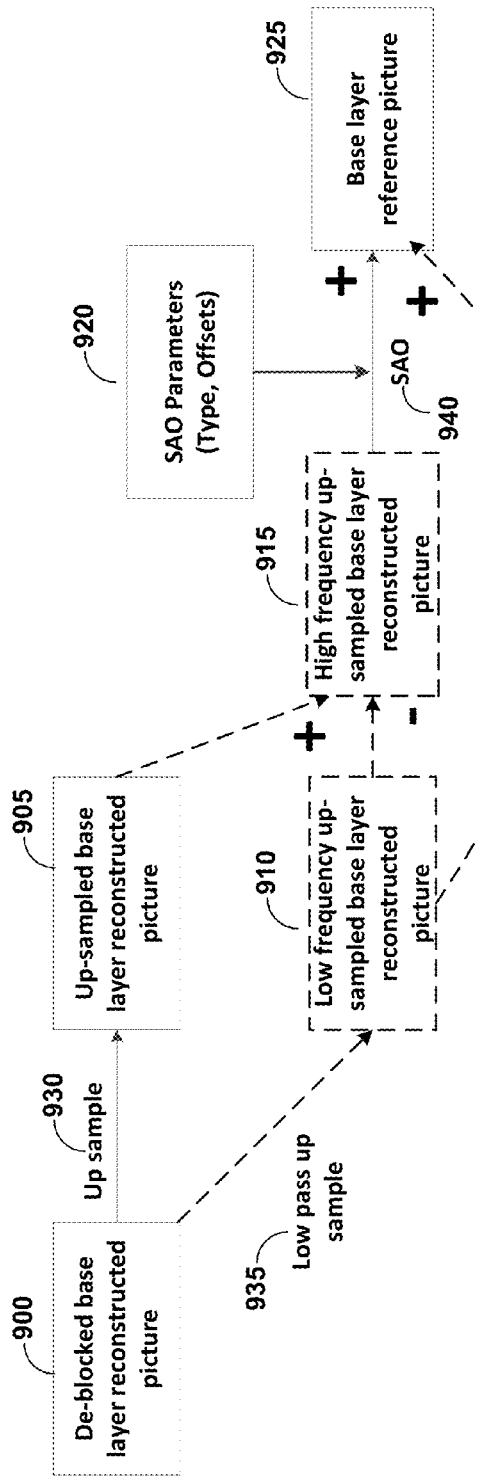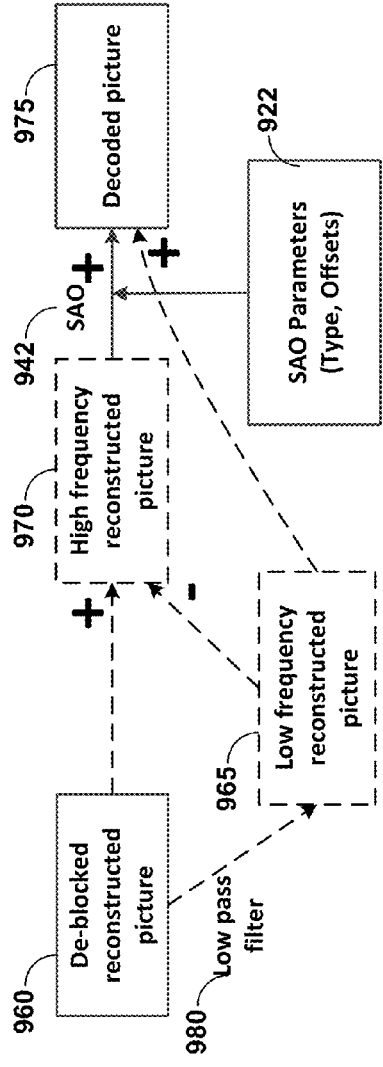
FIG. 9A
FIG. 9B

HIGH-FREQUENCY-PASS SAMPLE ADAPTIVE OFFSET IN VIDEO CODING

The application claims the benefit of U.S. Provisional Application No. 61/747,023, filed Dec. 28, 2012, the entire content of which is incorporated by reference herein.

TECHNICAL FIELD

This disclosure generally relates to video coding and compression, and more particularly relates to sample adaptive offset (SAO) filtering in video coding processes, including scalable and/or multiview video coding processes.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

This disclosure presents techniques for sample adaptive offset (SAO) filtering that focus on filtering the changed region of a picture or layer (e.g., the high frequency component of video blocks of a picture or layer). In general, the techniques of this disclosure may be referred to as High-Frequency-Pass SAO (HSAO) filtering.

In one example of the disclosure, a method for coding video data comprises obtaining a decoded block of video data, separating the decoded block of video data into a low-frequency component and a high-frequency component, applying an SAO filter to the high-frequency component to generate a SAO filtered high-frequency component, and combining the SAO filtered high-frequency component and the low-frequency component to generate a filtered decoded block of video data.

In another example of the disclosure, an apparatus configured to code video data comprises a video coder configured to obtain a decoded block of video data, separate the decoded block of video data into a low-frequency component and a high-frequency component, apply an SAO filter to the high-frequency component to generate a SAO filtered high-frequency component, and combine the SAO filtered high-frequency component and the low-frequency component to generate a filtered decoded block of video data.

In another example of the disclosure, an apparatus configured to code video data comprises means for obtaining a decoded block of video data, means for separating the decoded block of video data into a low-frequency component and a high-frequency component, means for applying an SAO filter to the high-frequency component to generate a SAO filtered high-frequency component, and means for combining the SAO filtered high-frequency component and the low-frequency component to generate a filtered decoded block of video data.

In another example, this disclosure describes a computer-readable storage medium storing instructions that, when executed, cause one or more processors of a device to code video data to obtain a decoded block of video data, separate the decoded block of video data into a low-frequency component and a high-frequency component, apply an SAO filter to the high-frequency component to generate a SAO filtered high-frequency component, and combine the SAO filtered high-frequency component and the low-frequency component to generate a filtered decoded block of video data.

The details of one or more examples of the disclosure are set forth in the accompanying drawings and the description below. Other features, objects, and advantages will be apparent from the description, drawings, and claims.

BRIEF DESCRIPTION OF DRAWINGS

FIG. 5 is a conceptual diagram showing examples of edge offset classifications for edge-based sample adaptive offset filtering.

FIGS. 7A-7D are conceptual diagrams that illustrate the spectrum changes between the enhancement layer original picture and the up-sampled based layer reconstructed picture (after base layer de-blocking filter).

FIGS. 9A-9B are flow diagrams illustrating a decoding procedure for High-Frequency-Pass SAO (HSAO) in accordance with the techniques of this disclosure.

DETAILED DESCRIPTION

Figure 1:
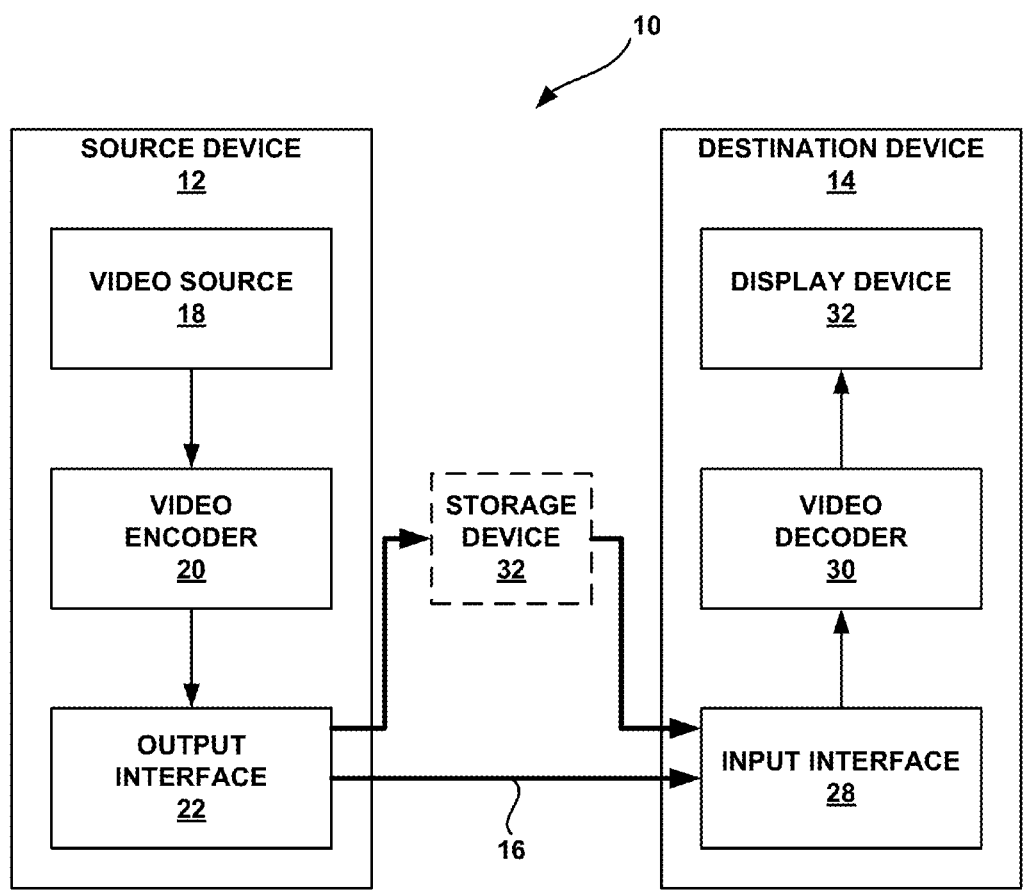
FIG. 1 is a block diagram illustrating an example video encoding and decoding system that may utilize the sample adaptive offset filtering techniques described in this disclosure.

This disclosure describes techniques related to various loop filtering operations that may be performed as part of a video coding process, including a scalable, multiview, high bit depth, and/or screen content video coding process. In some examples, this disclosure describes techniques related to the high efficiency video coding (HEVC) standard and its extensions for scalable video coding (SHEVC), multi-view video coding (MV-HEVC), three-dimensional video coding (3D-HEVC), high dynamic range video coding (HEVC RExt) and screen content coding (SCC).

Sample adaptive offset (SAO) filtering is a type of filtering used in video coding. In general, when applying SAO filtering, the addition of offset values to pixels in a video frame (e.g., a reconstructed picture or decoded picture) may in some instances improve coding without greatly increasing the bit overhead needed to store or transmit encoded video data. The improvement in coding that potentially results from SAO filtering may be, for example, that a decoded or reconstructed picture more closely resembles an original picture. As will be explained in greater detail below, SAO techniques allow for different offset values to be applied to different pixels (or blocks of pixels) depending on pixel (or block) classification metrics, such as edge metrics, band metrics, or other types of metrics.

Sample adaptive offset filters are applied to the spatial domain (i.e., pixel values), typically to pixels of de-blocked reconstructed and/or decoded pictures (e.g., for in-loop implementations) or to the pixels of up-sampled base layer pictures (e.g., for inter layer coding implementations). As such, conventional applications of SAO are applied to the entire frequency band of blocks of a picture or layer. However, when comparing a reconstructed or decoded picture with the original picture, the differences mainly come from high frequency components because of transform quantization and de-blocking filtering.

Likewise, when comparing an up-sampled base layer reconstructed or decoded picture with the enhancement layer original picture (for a spatial scalability implementation in scalable video coding), the differences also mainly come from high frequency components because the input base layer original picture is generated by down-sampling the enhancement layer original picture. Aliasing may occur in the high frequency band due to the down-sampling.

As such, conventional techniques for SAO filtering may be inefficient, as SAO filtering is applied in the spatial domain, and thus to a portion of a picture or layer (i.e., the low-frequency components of the picture or layer) that is relatively unchanged from the original picture. Accordingly, SAO filtering is being performed on a portion of a picture or layer with little to no benefit.

In view of these drawbacks, this disclosure presents techniques for SAO filtering that focus on filtering the changed region of a picture or layer (e.g., the high frequency component of video blocks of a picture or layer). In general, the techniques of this disclosure may be referred to as High-Frequency-Pass SAO (HSAO) filtering.

In general, the techniques of this disclosure of SAO filtering may be applied to video blocks in reconstructed or decoded pictures 2D video coding (e.g., HEVC), or may be applied to video blocks in reconstructed or decoded layers of pictures coded according to scalable (e.g., SHEVC), multi-view (MV-HEVC), 3D (3D-HEVC), high bit depth (HEVC RExt), and/or screen content coding (SCC) extensions of a video coding standard. In the context of this disclosure, a layer may be a layer in scalable video coding process (e.g., H.264/SVC or scalable extensions of the emerging high efficiency video coding (HEVC) standard), a texture view in multi-view or 3D video coding, or a depth view in 3D video coding. As another example, a layer may correspond to a single view that includes both texture view components and depth view components. Thus, the term "layer" may generally be used in this disclosure to refer to a layer in the sense of scalable video coding or a view in the sense of multiview or 3D video coding. The techniques of this disclosure may apply to any such video coding scenarios, including multi-view extensions, 3D video extensions, and scalable extension of HEVC and H.264/AVC.

FIG. 1 is a block diagram illustrating an example video encoding and decoding system 10 that may utilize the SAO techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 32. Similarly, encoded data may be accessed from storage device 32 by input interface. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video generated by source device 12. Destination device 14 may access stored video data from storage device 32 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

The techniques of this disclosure for SAO filtering are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 32 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 32, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to other video compression standards, including the High Efficiency Video Coding (HEVC) standard presently under development. A draft of the HEVC standard, referred to as "HEVC Working Draft 9," is described in Bross et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11th Meeting: Shanghai, China, October, 2012, which, as of 28 Dec. 2012, is downloadable from http://phenix.int-evry.fr/jct/doc_end_user/documents/11_Shanghai/wg11/JCTVC-K1003-v8.zip, the entire content of which is incorporated herein by reference. The techniques of this disclosure, however, are not limited to any particular coding standard or technique.

A more recent draft of HEVC is described in ITU-T H.265, SERIES H: AUDIOVISUAL AND MULTIMEDIA SYSTEMS, Infrastructure of Audiovisual Services—Coding of Moving Video, "High Efficiency Video Coding," April 2013 (hereinafter, "HEVC"). HEVC is incorporated by reference herein in its entirety. Various extensions to HEVC have been proposed. One such extension is the HEVC Range Extension, described in "High Efficiency Video Coding (HEVC) Range Extensions text specification: Draft 4," JCTVC-N1005 v1, April 2013 (hereinafter, "JCTVC-N1005"). A recent Working Draft (WD) of SHEVC, entitled "High efficiency video coding (HEVC) scalable extension draft 3," Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013, and referred to as SHEVC WD3 hereinafter, is available from http://phenix.it-sudparis.eu/jct/doc_end_user/documents/14_Vienna/wg11/JCTVC-N1008-v3.zip, which is incorporated be reference herein in its entirety.

Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC developed the HEVC standard. The HEVC standardization efforts were based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of coding tree units (CTUs), also referred to as largest coding units (LCUs), that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and may be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more transform units (TUs). Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

HEVC extensions are also currently under development in JCT-3V and JCT-VC. In JCT-3V, two HEVC extensions, the multiview extension (MV-HEVC) and 3D video extension (3D-HEVC) are being developed. In addition, two AVC extensions, the MVC+D and 3D-AVC are being developed.

The latest versions of the ongoing standards are listed as follows

JCT3V-B1001, "Study Text of ISO/IEC 14496-10:2012/DAM2 MVC extension for inclusion of depth maps," M. Hannuksela (Nokia), Y. Chen (Qualcomm), G. Sullivan (Microsoft), T. Suzuki, S. Hattori (Sony), available at http://phenix.it-sudparis.eu/jct2/doc_end_user/documents/2_Shanghai/wg11/JCT3V-B1001-v1.zip.

JCT3V-B1002, "3D-AVC draft text 4," M. M. Hannuksela, Y. Chen, T. Suzuki, J.-R. Ohm, G. J. Sullivan, available at http://phenix.it-sudparis.eu/jct2/doc_end_user/documents/2_Shanghai/wg11/JCT3V-B1002-v1.zip.

JCT3V-B1004, "MV-HEVC Draft Text 2," G. Tech, K. Wegner, Y. Chen, M. Hannuksela, available at http://phenix.it-sudparis.eu/jct2/doc_end_user/documents/2_Shanghai/wg11/JCT3V-B1004-v1.zip.

JCT3V-B1005, "3D-HEVC Test Model 2," G. Tech, K. Wegner, Y. Chen, S. Yea, http://phenix.it-sudparis.eu/jct2/doc_end_user/documents/2_Shanghai/wg11/JCT3V-B1005-v1.zip.

Multi-view video coding, such as the multiview extensions of H.264 and 3D HEVC, generally includes coding multiple views, e.g. multiple images from different cameras for each instance of time, where simultaneously displaying any two images in the same time instance yields a 3D image in the case of 3D coding or yields an image of a desirable resolution in the case of scalable video coding. These multiple views are sometimes referred to as a base view and one or more non-base views. Typically, a base view is coded before non-base views, and, thus, has no interdependencies with other views in coding. Various characteristics of the non-base views, however, can be predicted from other views.

Multiview video coding techniques of extensions of the H.264/Advanced Video Coding (AVC) standard will now be discussed. However, the techniques of this disclosure may be applicable with any video coding standard that supports multiview coding and/or 3D coding multiview proposals for the HEVC standard (e.g., multiview HEVC and 3D-HEVC).

Figure 2:
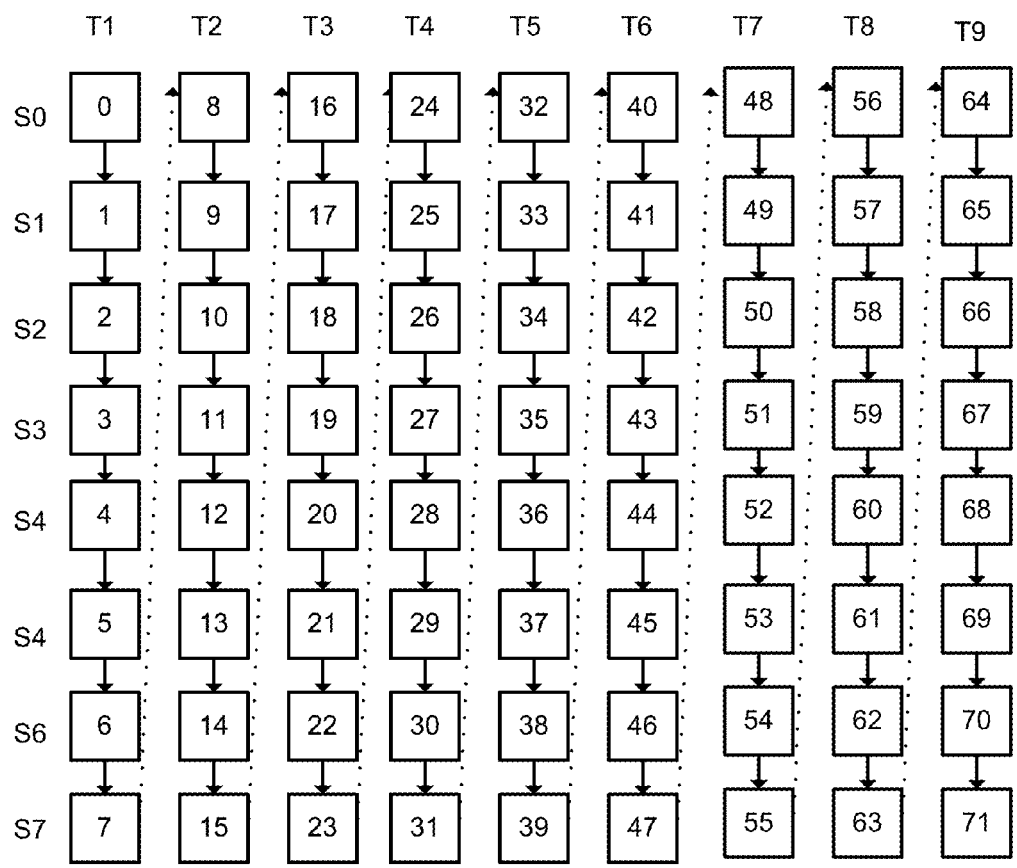
FIG. 2 is a conceptual diagram illustrating an example multiview decoding order.

Multiview video coding (MVC) is an extension of H.264/AVC. A typical MVC decoding order (i.e. bitstream order) is shown in FIG. 2. The decoding order arrangement is referred as time-first coding. Note that the decoding order of access units may not be identical to the output or display order. In FIG. 2, S0-S7 each refers to different views of the multiview video. T0-T9 each represents one output time instance. An access unit may include the coded pictures of all the views for one output time instance. For example, a first access unit may include all of the views S0-S7 for time instance T0, a second access unit may include all of the views S0-S7 for time instance T1, and so forth.

For purposes of brevity, the disclosure may use the following definitions:

view component: A coded representation of a view in a single access unit. When a view includes both coded texture and depth representations, a view component may include a texture view component and a depth view component.

texture view component: A coded representation of the texture of a view in a single access unit.

depth view component: A coded representation of the depth of a view in a single access unit.

As discussed above, in the context of this disclosure, the view component, texture view component, and depth view component may be generally referred to as a layer. In FIG. 2, each of the views includes sets of pictures. For example, view S0 includes set of pictures 0, 8, 16, 24, 32, 40, 48, 56, and 64, view S1 includes set of pictures 1, 9, 17, 25, 33, 41, 49, 57, and 65, and so forth. Each set includes two pictures: one picture is referred to as a texture view component, and the other picture is referred to as a depth view component. The texture view component and the depth view component within a set of pictures of a view may be considered as corresponding to one another. For example, the texture view component within a set of pictures of a view is considered as corresponding to the depth view component within the set of the pictures of the view, and vice-versa (i.e., the depth view component corresponds to its texture view component in the set, and vice-versa). As used in this disclosure, a texture view component that corresponds to a depth view component may be considered as the texture view component and the depth view component being part of a same view of a single access unit.

The texture view component includes the actual image content that is displayed. For example, the texture view component may include luma (Y) and chroma (Cb and Cr) components. The depth view component may indicate relative depths of the pixels in its corresponding texture view component. As one example, the depth view component is a gray scale image that includes only luma values. In other words, the depth view component may not convey any image content, but rather provide a measure of the relative depths of the pixels in the texture view component.

For example, a purely white pixel in the depth view component indicates that its corresponding pixel or pixels in the corresponding texture view component is closer from the perspective of the viewer, and a purely black pixel in the depth view component indicates that its corresponding pixel or pixels in the corresponding texture view component is further away from the perspective of the viewer. The various shades of gray in between black and white indicate different depth levels. For instance, a very gray pixel in the depth view component indicates that its corresponding pixel in the texture view component is further away than a slightly gray pixel in the depth view component. Because only gray scale is needed to identify the depth of pixels, the depth view component need not include chroma components, as color values for the depth view component may not serve any purpose.

The depth view component using only luma values (e.g., intensity values) to identify depth is provided for illustration purposes and should not be considered limiting. In other examples, any technique may be utilized to indicate relative depths of the pixels in the texture view component.

Figure 3:
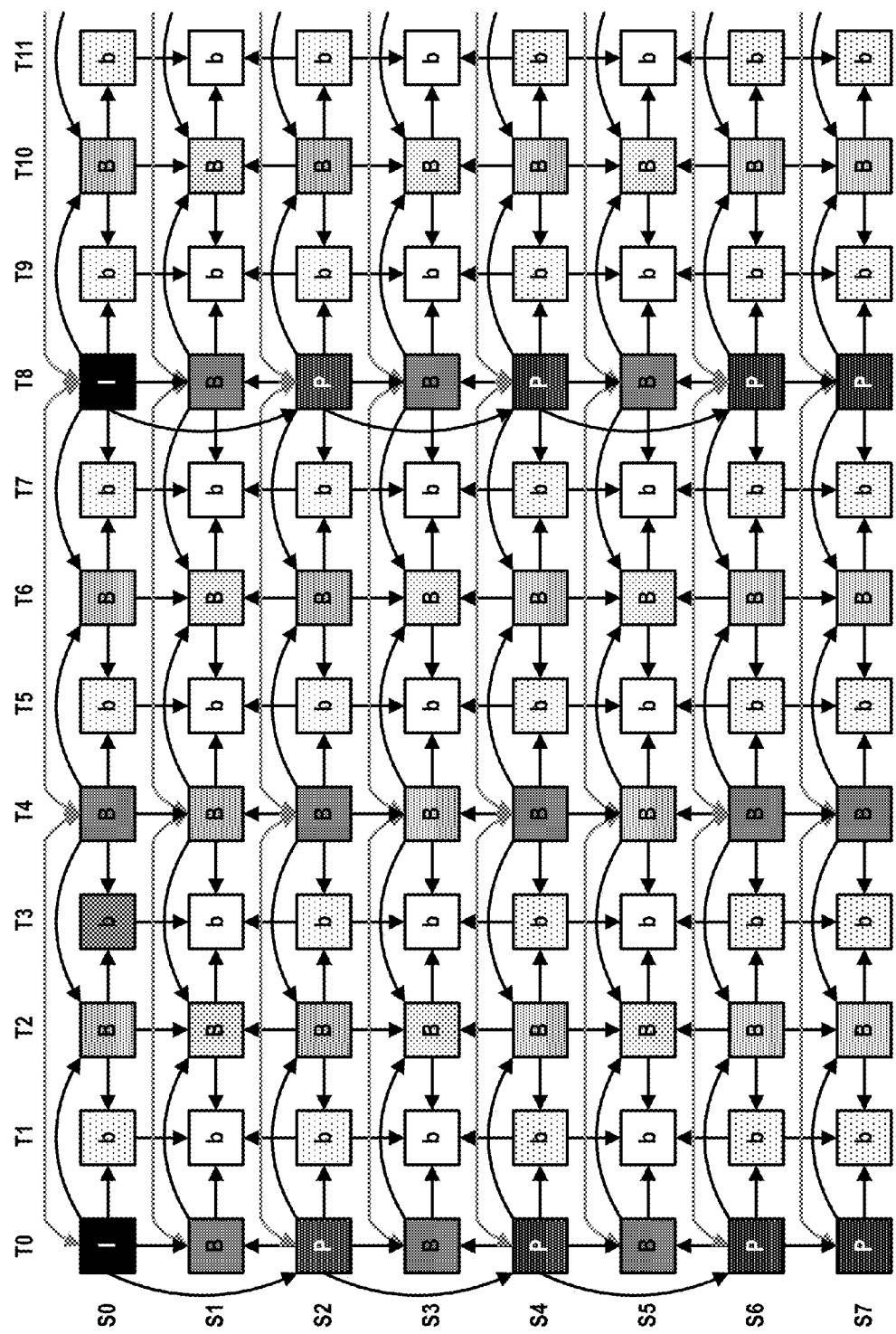
FIG. 3 is a conceptual diagram illustrating an example prediction structure for multiview coding.

A typical MVC prediction structure (including both inter-picture prediction within each view and inter-view prediction) for multi-view video coding is shown in FIG. 3. Prediction directions are indicated by arrows, the pointed-to object using the pointed-from object as the prediction reference. In MVC, inter-view prediction is supported by disparity motion compensation, which uses the syntax of the H.264/AVC motion compensation, but allows a picture in a different view to be used as a reference picture.

In the example of FIG. 3, six views (having view IDs "S0" through "S7") are illustrated, and twelve temporal locations ("T0" through "T11") are illustrated for each view. That is, each row in FIG. 3 corresponds to a view, while each column indicates a temporal location.

Although MVC has a so-called base view, which is decodable by H.264/AVC decoders, and stereo view pairs could be supported also by MVC, the advantage of MVC is that it could support an example that uses more than two views as a 3D video input and decodes this 3D video represented by the multiple views. A renderer of a client having an MVC decoder may expect 3D video content with multiple views.

Pictures in FIG. 3 are indicated at the intersection of each row and each column. The H.264/AVC standard may use the term frame to represent a portion of the video. This disclosure may use the term picture and frame interchangeably.

The pictures in FIG. 3 are illustrated using a block including a letter, the letter designating whether the corresponding picture is intra-coded (that is, an I-picture), or inter-coded in one direction (that is, as a P-picture) or in multiple directions (that is, as a B-picture). In general, predictions are indicated by arrows, where the pointed-to pictures use the pointed-from picture for prediction reference. For example, the P-picture of view S2 at temporal location T0 is predicted from the I-picture of view S0 at temporal location T0.

As with single view video encoding, pictures of a multi-view video coding video sequence may be predictively encoded with respect to pictures at different temporal locations. For example, the b-picture of view S0 at temporal location T1 has an arrow pointed to it from the I-picture of view S0 at temporal location T0, indicating that the b-picture is predicted from the I-picture. Additionally, however, in the context of multiview video encoding, pictures may be inter-view predicted. That is, a view component can use the view components in other views for reference. In MVC, for example, inter-view prediction is realized as if the view component in another view is an inter-prediction reference. The potential inter-view references are signaled in the Sequence Parameter Set (SPS) MVC extension and can be modified by the reference picture list construction process, which enables flexible ordering of the inter-prediction or inter-view prediction references. Inter-view prediction is also a feature of proposed multiview extension of HEVC, including 3D-HEVC (multiview plus depth).

FIG. 3 provides various examples of inter-view prediction. Pictures of view S1, in the example of FIG. 3, are illustrated as being predicted from pictures at different temporal locations of view S1, as well as inter-view predicted from pictures of views S0 and S2 at the same temporal locations. For example, the b-picture of view S1 at temporal location T1 is predicted from each of the B-pictures of view S1 at temporal locations T0 and T2, as well as the b-pictures of views S0 and S2 at temporal location T1.

In some examples, FIG. 3 may be viewed as illustrating the texture view components. For example, the I-, P-, B-, and b-pictures illustrated in FIG. 3 may be considered as texture view components for each of the views. In accordance with the techniques described in this disclosure, for each of the texture view components illustrated in FIG. 3 there is a corresponding depth view component. In some examples, the depth view components may be predicted in a manner similar to that illustrated in FIG. 3 for the corresponding texture view components.

Coding of two views may also be supported by MVC. One of the advantages of MVC is that an MVC encoder may take more than two views as a 3D video input and an MVC decoder may decode such a multiview representation. As such, any renderer with an MVC decoder may decode 3D video content with more than two views.

As discussed above, in MVC, inter-view prediction is allowed among pictures in the same access unit (meaning, in some instances, with the same time instance). When coding a picture in one of the non-base views, a picture may be added into a reference picture list, if it is in a different view but within a same time instance. An inter-view prediction reference picture may be put in any position of a reference picture list, just like any inter-prediction reference picture. As shown in FIG. 3, a view component can use the view components in other views for reference. In MVC, inter-view prediction is realized as if the view component in another view was an inter-prediction reference.

In MVC, inter-view prediction is allowed among pictures in the same access unit (i.e., with the same time instance). When coding a picture in one of the non-base views, a picture may be added into a reference picture list, if it is in a different view but with a same time instance. An inter-view prediction reference picture can be put in any position of a reference picture list, just like any inter prediction reference picture.

As shown in FIG. 3, a view component can use the view components in other views for reference. This is called inter-view prediction. In MVC, inter-view prediction is realized as if the view component in another view was an inter prediction reference. The potential inter-view references, however, are signaled in the Sequence Parameter Set (SPS) MVC extension (as shown in Table 1) and can be modified by the reference picture list construction process, which enables flexible ordering of the inter prediction or inter-view prediction references.

TABLE 1

SPS MVC Extension Syntax Table

| seq_parameter_set_mvc_extension( ) { | Descriptor |
|---|---|
|     num_views_minus1 | ue(v) |
|     for( i = 0; i <= num_views_minus1; i++ ) | |
|         view_id[ i ] | ue(v) |
|     for( i = 1; i <= num_views_minus1; i++ ) { | |
|         num_anchor_refs_l0[ i ] | ue(v) |
|         for( j = 0; j < num_anchor_refs_l0[ i ]; j++ ) | |
|             anchor_ref_l0[ i ][ j ] | ue(v) |
|         num_anchor_refs_l1[ i ] | ue(v) |
|         for( j = 0; j < num_anchor_refs_l1[ i ]; j++ ) | |
|             anchor_ref_l1[ i ][ j ] | ue(v) |
|     } | |
|     for( i = 1; i <= num_views_minus1; i++ ) { | |
|         num_non_anchor_refs_l0[ i ] | ue(v) |
|         for( j = 0; j < num_non_anchor_refs_l0[ i ]; j++ ) | |
|             non_anchor_ref_l0[ i ][ j ] | ue(v) |
|         num_non_anchor_refs_l1[ i ] | ue(v) |
|         for( j = 0; j < num_non_anchor_refs_l1[ i ]; j++ ) | |
|             non_anchor_ref_l1[ i ][ j ] | ue(v) |
|     } | |
|     num_level_values_signalled_minus1 | ue(v) |
|     for( i = 0; i <= num_level_values_signalled_minus1; i++ ) { | |
|         level_idc[ i ] | u(8) |
|         num_applicable_ops_minus1[ i ] | ue(v) |
|         for( j = 0; j <= num_applicable_ops_minus1[ i ]; j++ ) { | |
|             applicable_op_temporal_id[ i ][ j ] | u(3) |
|             applicable_op_num_target_views_minus1[ i ][ j ] | ue(v) |
|             for( k = 0; k <= applicable_op_num_target_views_minus1[ i ][ j ]; k++ ) | |
|                 applicable_op_target_view_id[ i ][ j ][ k ] | ue(v) |
|             applicable_op_num_views_minus1[ i ][ j ] | ue(v) |
|         } | |
|     } | |
| } | |

In the SPS MVC extension, for each view, the number of views that can be used to form reference picture list 0 and reference picture list 1 are signaled. Prediction relationships for an anchor picture, as signaled in the SPS MVC extension, can be different from the prediction relationship for a non-anchor picture (signaled in the SPS MVC extension) of the same view.

The next section discusses multi-view and 3D video coding with respect to HEVC. In particular, example techniques of this disclosure are applicable when coding two or more views, each with a texture view component and a depth view component. The plurality of video pictures for each view may be referred to as texture view components. Each texture view component has a corresponding depth view component. The texture view components include video content (e.g., luma and chroma components of pixel values), and the depth view components may indicate relative depths of the pixels within the texture view components.

The techniques of this disclosure relate to coding 3D video data by coding texture and depth data. In general, the term "texture" is used to describe luminance (that is, brightness or "luma") values of an image and chrominance (that is, color or "chroma") values of the image. In some examples, a texture image may include one set of luminance data and two sets of chrominance data, for blue hues (Cb) and red hues (Cr). In certain chroma formats, such as 4:2:2 or 4:2:0, the chroma data is downsampled relative to the luma data. That is, the spatial resolution of chrominance components is lower than the spatial resolution of corresponding luminance components, e.g., one-half or one-quarter of the luminance resolution.

Depth data generally describes depth values for corresponding texture data. For example, a depth image may include a set of depth pixels that each describes depth for corresponding texture data. The depth data may be used to determine horizontal disparity for the corresponding texture data. Thus, a device that receives the texture and depth data may display a first texture image for one view (e.g., a left eye view) and use the depth data to modify the first texture image to generate a second texture image for the other view (e.g., a right eye view) by offsetting pixel values of the first image by the horizontal disparity values determined based on the depth values. In general, horizontal disparity (or simply "disparity") describes the horizontal spatial offset of a pixel in a first view to a corresponding pixel in a second view, where the two pixels correspond to the same portion of the same object as represented in the two views.

In still other examples, depth data may be defined for pixels in a z-dimension perpendicular to the image plane, such that a depth associated with a given pixel is defined relative to a zero disparity plane defined for the image. Such depth may be used to create horizontal disparity for displaying the pixel, such that the pixel is displayed differently for the left and right eyes, depending on the z-dimension depth value of the pixel relative to the zero disparity plane. The zero disparity plane may change for different portions of a video sequence, and the amount of depth relative to the zero-disparity plane may also change. Pixels located on the zero disparity plane may be defined similarly for the left and right eyes. Pixels located in front of the zero disparity plane may be displayed in different locations for the left and right eye (e.g., with horizontal disparity) so as to create a perception that the pixel appears to come out of the image in the z-direction perpendicular to the image plane. Pixels located behind the zero disparity plane may be displayed with a slight blur, to present a slight perception of depth, or may be displayed in different locations for the left and right eye (e.g., with horizontal disparity that is opposite that of pixels located in front of the zero disparity plane). Many other techniques may also be used to convey or define depth data for an image.

For each pixel in the depth view component, there may be one or more corresponding pixels in the texture view component. For instance, if the spatial resolutions of the depth view component and the texture view component are the same, each pixel in the depth view component corresponds to one pixel in the texture view component. If the spatial resolution of the depth view component is less than that of the texture view component, then each pixel in the depth view component corresponds to multiple pixels in the texture view component. The value of the pixel in the depth view component may indicate the relative depth of the corresponding one or more pixels in the texture view.

In some examples, a video encoder signals video data for the texture view components and the corresponding depth view components for each of the views. A video decoder utilizes both the video data of texture view components and the depth view components to decode the video content of the views for display. A display then displays the multiview video to produce 3D video.

Figure 4:
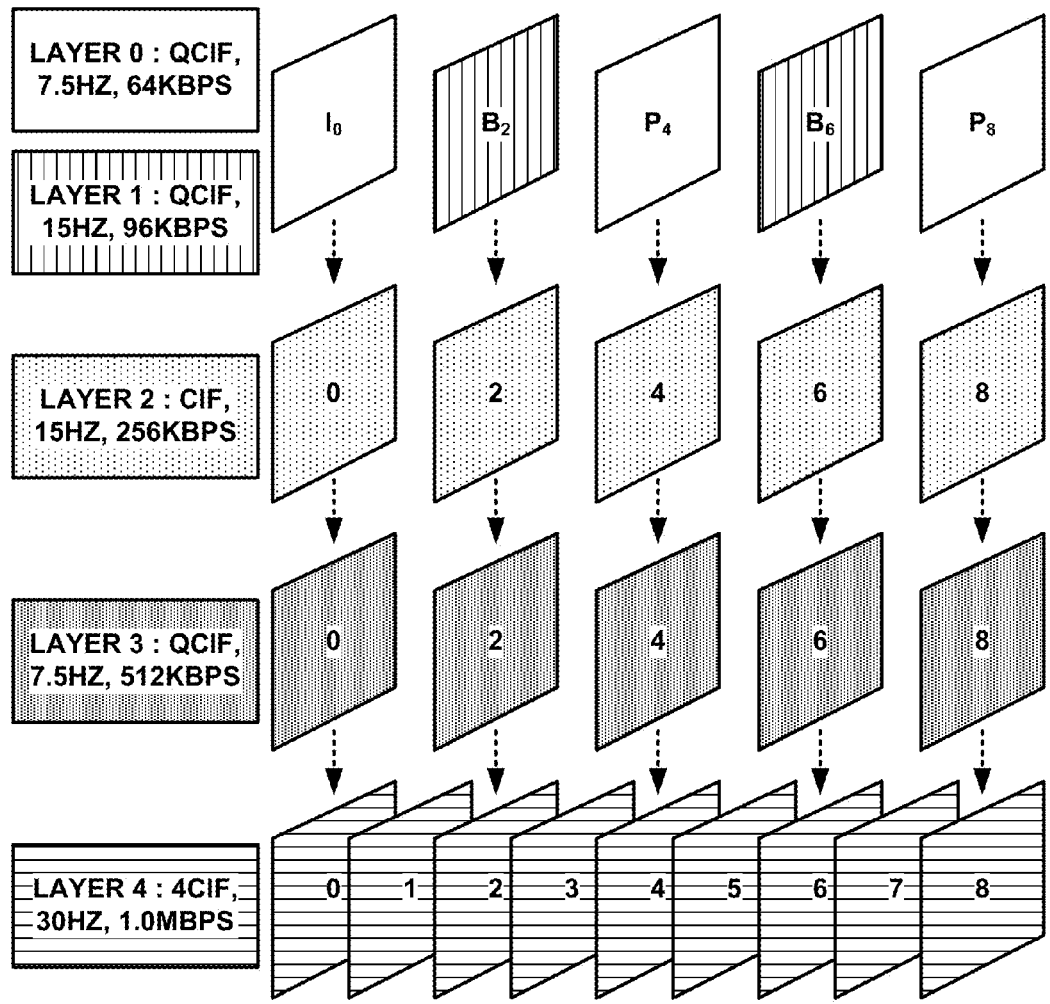
FIG. 4 is a conceptual diagram illustrating example scalable video coding layers.

Scalable extensions of HEVC are also being developed by JCT-VC. FIG. 4 is a conceptual diagram illustrating one example of scalable video coding. While FIG. 4 is described with respect to H.264/AVC and SVC, it should be understood that similar layers may be coded suing other multi-layer video coding schemes, including scalable extension of HEVC. The example of FIG. 4 shows layers coded using the same codec. In other examples, layers may be coded using a multi-standard codec. For example, a base layer may be coded using H.264/AVC, while an enhancement layer may be coded using a scalable extension to HEVC. Thus, references to SVC below may apply to scalable video coding in general, and are not restricted to H.264/SVC.

In SVC, scalabilities may be enabled in three dimensions including, for example, spatial, temporal, and quality (represented as a bit rate or signal to noise ratio (SNR)). In general, better representation can be normally achieved by adding to a representation in any dimension. For example, in the example of FIG. 4, layer 0 is coded at Quarter Common Intermediate Format (QCIF) having a frame rate of 7.5 Hz and a bit rate of 64 kilobytes per second (KBPS). In addition, layer 1 is coded at QCIF having a frame rate of 15 Hz and a bit rate of 64 KBPS, layer 2 is coded at CIF having a frame rate of 15 Hz and a bit rate of 256 KBPS, layer 3 is coded at QCIF having a frame rate of 7.5 Hz and a bit rate of 512 KBPS, and layer 4 is coded at 4CIF having a frame rate of 30 Hz and a bit rate of Megabyte per second (MBPS). The particular number, contents and arrangement of the layers shown in FIG. 4 are provided for purposes of example only.

In any case, once a video encoder (such as video encoder 20) has encoded content in such a scalable way, a video decoder (such as video decoder 30) may use an extractor tool to adapt the actual delivered content according to application requirements, which may be dependent e.g., on the client or the transmission channel.

In SVC, pictures having the lowest spatial and quality layer are typically compatible with H.264/AVC. In the example of FIG. 4, pictures with the lowest spatial and quality layer (pictures in layer 0 and layer 1, with QCIF resolution) may be compatible with H.264/AVC. Among them, those pictures of the lowest temporal level form the temporal base layer (layer 0). This temporal base layer (layer 0) may be enhanced with pictures of higher temporal levels (layer 1).

In addition to the H.264/AVC compatible layer, several spatial and/or quality enhancement layers may be added to provide spatial and/or quality scalabilities. Each spatial or quality enhancement layer itself may be temporally scalable, with the same temporal scalability structure as the H.264/AVC compatible layer.

Details of SAO coding will now be discussed. In general, the addition of offset values to pixels in an LCU may improve coding in some instances. For example, offset values may be applied to pixels of a reconstructed video block in order to compensate for illumination changes, quantization errors, or more generally, to make decoded video data more closely resemble original video data.

SAO techniques allow for different offset values to be applied to different pixels (or blocks of pixels) depending on the pixel values of a pixel (or block). The offset value to be applied to a pixel can be determined based on the value of a pixel. For example, if a pixel has a value that is within a first band, then an offset associated with the first band can be applied to the pixel. If the pixel has a value that is within a second band, then an offset associated with the second band can be applied to the pixel, and so on for all bands.

In some configurations, a video coder (e.g., video encoder 20 and/or video decoder 30) unit may be configured to perform two types of SAO filtering, generally referred to in this disclosure as band offset filtering and edge offset filtering. An SAO filter unit may also at times apply no offset, which as will be explained more below, can itself be considered a third type of SAO filtering. The type of SAO filtering applied by an SAO filter may be either explicitly or implicitly signaled to a video decoder.

When applying edge offset filtering, pixels can be classified based on edge information of a coding unit, and an offset can be determined for pixels based on the edge classification. As will be explained in greater detail below, there are typically four variations of edge-based SAO, where the value of a pixel is compared to two of its eight neighboring pixels. Which two pixels are used for comparison depends on which variation of edge-based offset is used. Based on the magnitude difference, an offset is added to the pixel value.

When applying band offset filtering, pixels can be classified into different bands based on a pixel value, such as an intensity value, with each band having an associated offset. A band includes a range of pixel values. For example, pixel values ranging from 0 to 255 may be divided into 32 equal bands (labeled 0 to 31), such that pixel values 0-7 are a first band, pixel values 8-15 are a second band, pixel values 16-23 are a third band, and so on for all thirty-two bands. The bands can be used for determining which particular offset value to apply to a pixel or group of pixels. For example, if a pixel has a value of 10 (which is within the second band, i.e. values 8-15, in the example above), then an offset associated with the second band can be added to the pixel value.

For purposes of signaling and generating the offsets for the various bands, the bands may be grouped into two or more groups. For band offset filtering, pixels may, for example, be categorized into thirty-two bands (bands 0-31) as described above, and the bands may be grouped into two groups (e.g., two groups of sixteen bands, one group of four bands and one group of twenty-eight bands, one group of eight bands and one group of twenty-four bands, or other such groupings). The groupings of bands can be used for determining the order in which the offset values for the bands are signaled in the encoded video bitstream, and/or can be used to determine if a particular band has an offset value other than zero. Offsets for the bands may be signaled using differential coding techniques in which a current value is signaled as a difference between the current value and a previous value. The amount of bit savings achieved by using such coding techniques may in some instances be dependent on the ordering in which the values are signaled. For example, a greater bit savings may be achieved in instances where offset values that are close in value are signaled consecutively. In some instances, all the offset values for a particular group, such as the second group, may be assumed to be zero.

In some current proposals for HEVC, SAO filtering may be enabled and disabled at the slice level, and furthermore, SAO filtering may be enabled and disabled separately for luma and chroma samples. For example, for a particular slice of video data, both luma and chroma samples may be SAO filtered; neither luma nor chroma samples may be SAO filtered; or one of luma and chroma samples may be SAO filtered while the other is not. When SAO filtering is enabled for a slice, then SAO type and offset values are signaled at an LCU level. As introduced above, the SAO type can include band offset filtering, edge offset filtering, or no SAO filtering. Thus, even if SAO filtering is enabled for a particular slice, some LCUs of that slice may not be SAO filtered (i.e. some LCUs may have an SAO type of no SAO filtering). In some instances, the SAO type and the offset values are signaled with a series of merge flags, where a true value for a first merge flag indicates the offset type and the offset values for the LCU are inherited from a left neighboring LCU and a true value for a second merge flag indicates the SAO type and the offset values are inherited from an above neighboring LCU. If both merge flags are false, then a new SAO type and new offset values are signaled for the LCU.

Edge offset type SAO filtering will now be discussed. In edge type SAO filtering, each partition (which consists of a set of LCUs) can have one of three offset types (also called pixel classifications). The three offset types are no offset, band classification based offset type 0/1, and edge classification based type 0/1/2/3. Each band classification offset type may, for example, have 16 possible offset values, while each edge classification based type may have 4 possible offset values. If one of these offset types is chosen to be used for the partition, information indicating the corresponding offset type and the offset values can be signaled in the encoded video bitstream.

Figure 5:
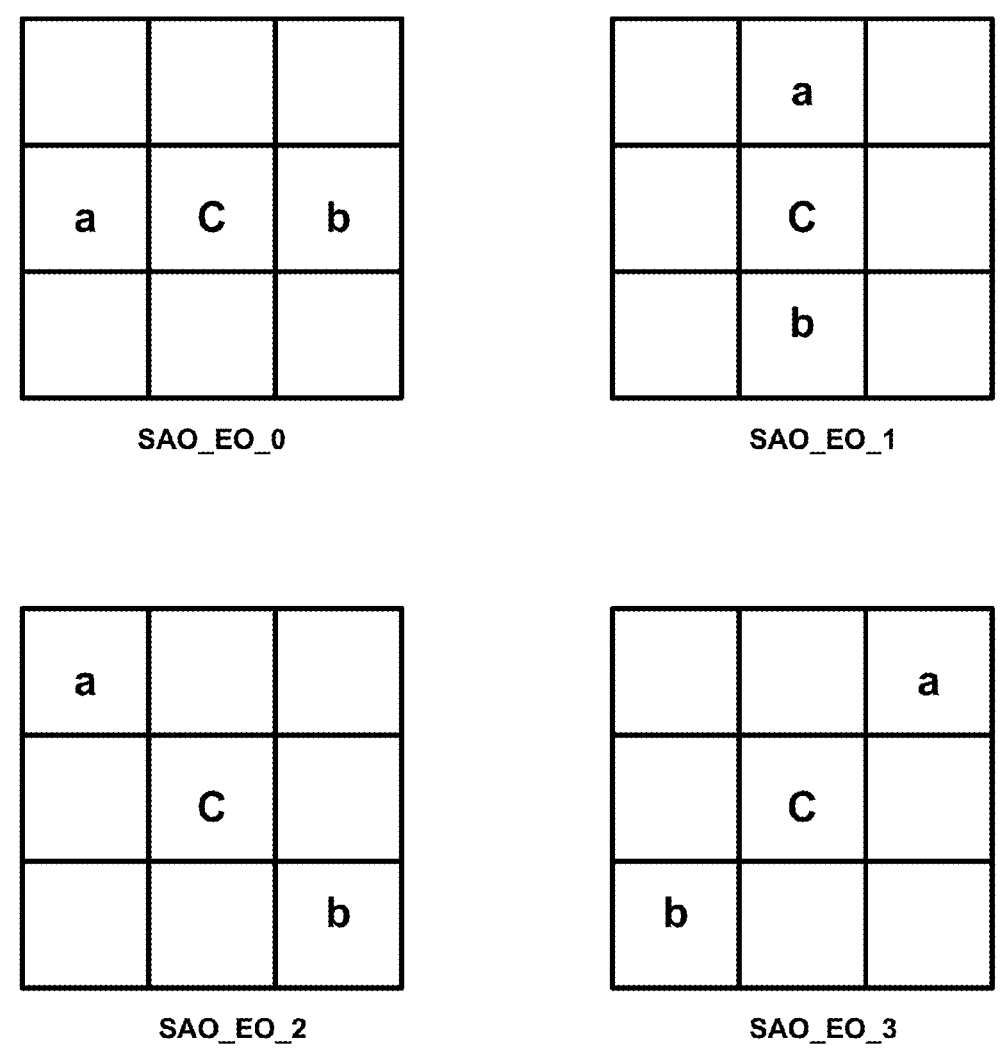

FIG. 5 is a conceptual diagram showing the four possible edge offset classifications used in one implementation of SAO filtering. In the example of FIG. 5, the edge offset type classifies each pixel based on edge information. For each of the edge classifications shown in FIG. 5, an edge type for the current pixel (i.e. a particular pixel being coded) is calculated by comparing the value of the current pixel (C) to the values of neighboring pixels (a and b). For SAO edge offset of classification zero (SAO_EO_0), the current pixel is compared to the left and right neighbor pixels. For SAO edge offset of classification one (SAO_EO_1), the current pixel is compared to the top and bottom neighbor pixels. For SAO edge offset of classification two (SAO_EO_2), the current pixel is compared to the upper left and bottom right neighbor pixels. For SAO edge offset of classification three (SAO_EO_3), the current pixel is compared to the bottom left and upper right neighbor pixels.

Initially, the edge type of the current pixel is assumed to be zero. If the value of current pixel C is equal to values of both the left and right neighbor pixels (a and b), the edge type remains at zero. If the value of the current pixel C is greater than the value of neighbor pixel a, the edge type is increased by one. If the value of the current pixel C is less than the value of neighbor pixel a, the edge type is decreased by one. Likewise, if the value of the current pixel C is less than the value of neighbor pixel b, the edge type is increased by one, and if the value of the current pixel C is less than the value of the neighbor pixel b, the edge type is decreased by 1.

As such, the current pixel C may have an edge type of −2, −1, 0, 1, or 2. The edge type is −2 if the value of current pixel C is less than both values of neighbor pixels a and b. The edge type is −1 if the value of current pixel C is less than one neighbor pixel, but equal to the other neighbor pixel. The edge type is 0 if the value of current pixel C is the same as both neighbor pixels, or if the value of current pixel C is greater than one neighbor pixel, but less than the other neighbor pixel. The edge type is 1 if the value of the current pixel C is greater than one neighbor pixel, but equal to the other neighbor pixel. The edge type is 2 if the value of the current pixel C is greater than both values of neighbor pixels a and b. For each non-zero edge type value, four offset values are determined and signaled in the encoded video bitstream for use by a decoder (i.e., $eoffset_{-2}$, $eoffset_{-1}$, $eoffset_1$, $eoffset_2$).

In view of the above description, for each edge offset classification, edge type values may be computed with the following pseudocode:

```
EdgeType = 0;
if (C > Pixel 1) EdgeType = EdgeType + 1;
if (C < Pixel 1) EdgeType = EdgeType − 1;
if (C > Pixel 2) EdgeType = EdgeType + 1;
if (C < Pixel 2) EdgeType = EdgeType − 1
```

For each edge offset direction, the current pixel (denoted by 'c' in FIG. 5) is classified into one category based on neighboring pixels (denoted by 'a' and 'b') with decode side derivation as shown in Table 2. Four edge offset values may be transmitted for the category 1-4.

TABLE 2

Four edge offset categories with different neighboring pixels

| Category | Condition |
|---|---|
| 1 | c<a && c<b |
| 2 | (c<a && c==b) \|\| (c==a && c<b) |
| 3 | (c>a && c==b) \|\| (c==a && c>b) |
| 4 | c>a && c>b |
| 0 | None of the condition 1-4 |

Figure 6:
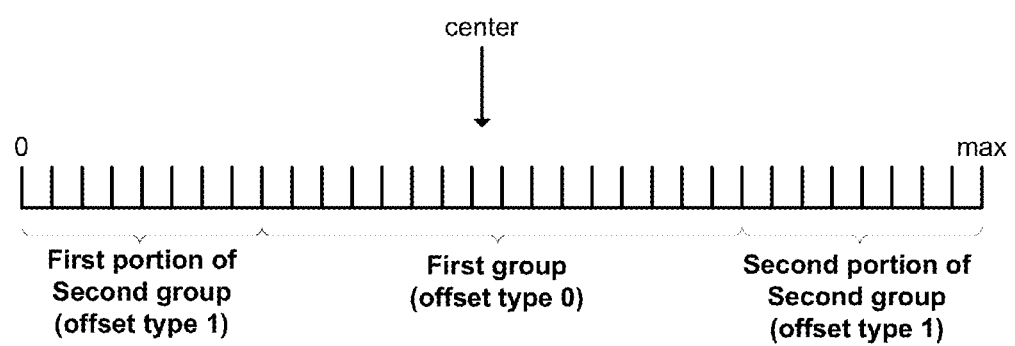
FIG. 6 is a conceptual diagram showing example grouping of bands for band offset classifications for band-based sample adaptive offset filtering.

FIG. 6 is a conceptual diagram showing example bands based on intensity values. For purposes of example, assume pixel values range from 0-255, although other ranges may also be used. In such an example, the max value shown in FIG. 6 would be equal to 255, and each of the thirty-two bands shown in FIG. 6 would have a range of 8. The left-most band would be pixel values 0-7, the next band would be for pixel values of 8-15, the next band would be for pixel values 16-23, and so on, until the right most band which would be for pixel values 248-255. For band offset, pixels are classified into different bands based on intensity (i.e., for band offset classification, pixels are categorized into one of the thirty-two bands). Based on the band into which a pixel value falls, an offset is added to the pixel. For example, if a pixel has a value of 19, then the pixel value falls within the third band which ranges from pixel value 16 to 23. Thus, an offset associated with the third band is added to the pixel value of 19.

For purposes of signaling the offset values associated with each bands, the bands can be grouped into two or more groups. In some implementations, the sixteen bands in the center (bands 8-23) are classified into one group and the remaining bands (bands 0-7 and 24-31) are classified into a second group. For each group of bands, 16 offset values (i.e., $boffset_0, \ldots, boffset_{15}$) are determined and are signaled in the encoded video bitstream for use by a video decoder. In some implementations, all the offset values for a group, such as the second group, may be assumed to be 0, in which case no signaling of offset values for that group needs to be included in the encoded video bitstream. In some implementations, offsets are only applied to four contiguous bands. The starting band position and four offset values are signaled.

As shown in FIG. 6, the middle sixteen bands (bands 8-23) constitute the first group of bands, while the eight left-most bands (band 0-7) constitute the first portion of a second group of bands, and the eight right-most bands (bands 24-31) constitute a second portion of the second group of bands. These groupings of bands constitute one of many possible groupings. Furthermore, in some configurations, the groupings used may be fixed, but in other configurations, the groupings may be adaptive.

As described above, conventional applications of SAO are applied to the entire frequency band of blocks of a picture or layer. However, when comparing a reconstructed or decoded picture with the original picture, the differences mainly come from high frequency components because of quantization. As such, conventional techniques for SAO filtering may be inefficient, as SAO filtering is applied in the spatial domain, and thus to a portion of a picture or layer (i.e., the low-frequency components of the picture or layer) that is relatively unchanged from the original picture. Accordingly, SAO filtering is being performed on a portion of a picture or layer with little to no benefit. In view of these drawbacks, this disclosure presents techniques for SAO filtering that focus on filtering the 'changed region of a picture or layer (e.g., the high frequency component of video blocks of a picture or layer).

As an example for the case of spatial scalability, FIGS. 7A-7D are conceptual diagrams that illustrate the spectrum changes between an original picture (e.g., a picture decodable by using an enhancement layer) and an up-sampled base layer reconstructed/decoded picture (e.g., after base layer de-blocking filter). In this example, the base layer picture has a lower amount of spatial resolution than the original picture. To produce a final picture of the same size when only decoding a base layer picture, the pixels of the decoded base layer may be up-sampled. Up-sampling may be accomplished using any up-sampling techniques, include duplication, averaging, or more advanced interpolation techniques.

It should be noted that the SAO techniques of this disclosure may be applied to pictures in either a video encoding or decoding process. The techniques of this disclosure may be applied to reconstructed pictures and/or video blocks (e.g., pictures and/or video blocks) generated in the reconstruction loop of video encoder 20) or to decoded pictures and/or video blocks (e.g., pictures and/or video blocks decoded by video decoder 30). The terms reconstructed picture or decoded picture may be used interchangeably, and each may refer to pictures produced by a video encoder or a video decoder. That is, a decoded picture may refer to a picture generated by the reconstruction loop of video encoder 20 or by the decoding process of video decoder 30. Likewise, a reconstructed picture may refer to a picture generated by the reconstruction loop of video encoder 20 or by the decoding process of video decoder 30.

FIG. 7A shows an example frequency spectrum or an original picture. FIG. 7B shows the frequency spectrum of a base layer picture encoded to be at a lower spatial resolution than the original picture. As can be seen in FIG. 7B, the frequency spectrum of a down-sampled base layer picture exhibits a different frequency spectrum, often with some aliasing artifacts. FIG. 7C shows an frequency spectrum of the base layer picture after reconstruction/decoding and de-blocking. At this state of decoding, additional quantization artifacts may be present in the reconstructed base layer picture.

FIG. 7D shows an frequency spectrum of the base layer picture after it has been up-sampled to be the same resolution as the original picture from FIG. 7A. Comparing the frequency spectrum of the up-sampled and reconstructed/decoded base layer picture in FIG. 7D to the original picture of FIG. 7A typically shows two main features. One feature is an 'unchanged region' around the lower frequencies where the frequency spectrum of the original picture and the frequency spectrum up-sampled and reconstructed/decoded base layer picture are substantially the same. The other feature is a 'changed' region around relatively higher frequencies where the frequency spectrum of the original picture and the frequency spectrum up-sampled and reconstructed/decoded base layer picture are quite different. In essence, in this example of spatial scalability-based scalable video coding, the decoding/reconstruction and up-sampling processing of a base layer picture mainly causes differences, relative to the original picture, in high frequency components.

Figure 8A:
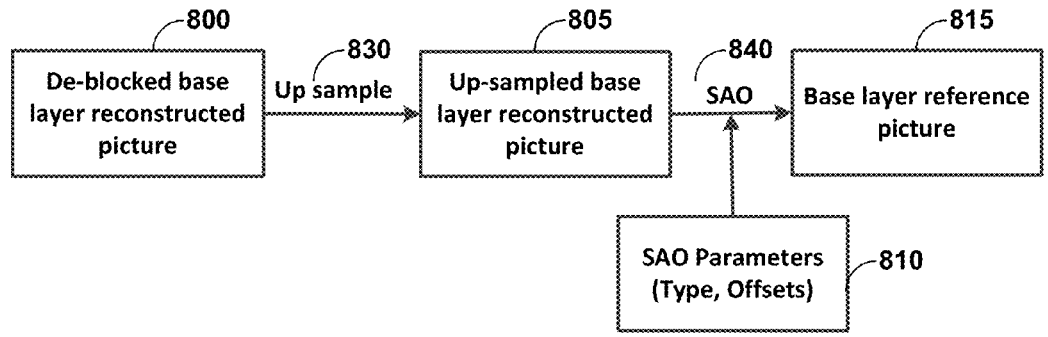
FIGS. 8A and 8B are flow diagrams illustrating decoding procedures where SAO filtering is applied to both the unchanged and changed regions of a reconstructed video block
Figure 8B:
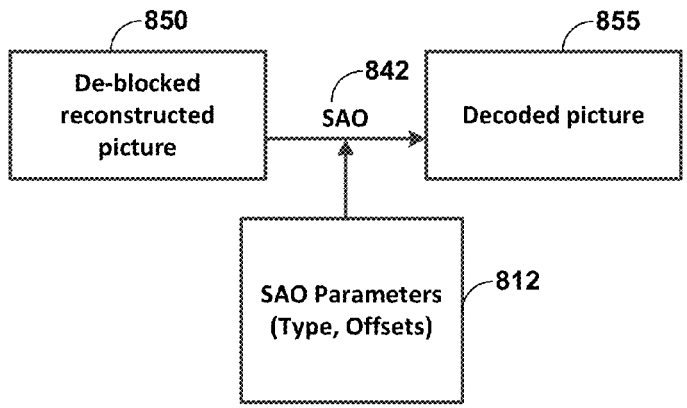

Current sample adaptive offset filtering applies to both an 'unchanged region' of a decoded picture and a 'changed region' of a picture. FIGS. 8A and 8B are flow diagrams illustrating decoding procedures where SAO filtering is applied to both the unchanged and changed regions of a constructed video block. In one example, SAO unit 74 of video encoder 20 (see FIG. 10) or SAO unit 94 of video decoder 30 (see FIG. 11) may implement the techniques of FIG. 8A and FIG. 8B, though other functional units of video encoder 20 and video decoder 30 may also contribute.

FIG. 8A illustrates an example technique for SAO filtering where a reconstructed block of video data is a base layer reconstructed block of video data that is upsampled prior to SAO filtering. As shown in FIG. 8A, a de-blocked base layer reconstructed picture 800 is up-sampled (830) to produce an up-sampled base layer reconstructed picture 805. SAO filtering is then applied (840) using SAO parameters 810. As discussed above, SAO parameters 810 may include the SAO type (e.g., edge offset, band offset, no offset) and the offset values. SAO filtering produces base layer reference picture 815.

FIG. 8B illustrates an example technique for SAO filtering where a reconstructed block of video data is deblocked reconstructed block of video data. FIG. 8B may correspond to an in-loop SAO filtering process (e.g., in video encoder 20 or video decoder 30). De-blocked and reconstructed picture 850 is filtered by an SAO filter (842) using SAO parameters 812 to produce decoded picture 855. SAO parameters 812 may include the SAO type (e.g., edge offset, band offset, no offset) and the offset values.

FIGS. 9A-9B are flow diagrams illustrating a decoding procedure for High-Frequency-Pass SAO (HSAO) in accordance with the techniques of this disclosure. Generally, in HSAO, SAO filtering is applied to specific frequency bands of a picture or video block, especially the high frequency bands, as the high frequency bands are most likely to be changed relative to an original video block or picture. In one example, SAO unit 74 of video encoder 20 (see FIG. 10) or SAO unit 94 of video decoder 30 (see FIG. 11) may implement the techniques of FIG. 9A and FIG. 9B, though other functional units of video encoder 20 and video decoder 30 may also contribute. In FIGS. 9A and 9B, the dashed lines represent steps in the SAO filtering procedure that are different than conventional techniques. That is, the dashed lines signify HSAO techniques proposed in this disclosure.

FIG. 9A illustrates an example where inter-layer HSAO for spatial scalability in scalable video coding (e.g., SHEVC or H.264/SVC) is used. In HSAO, the SAO filtering is applied to a region of a video block or picture that is most likely to be changed relative to the original picture (i.e., 'changed region'). Initially, a de-blocked base layer reconstructed picture 900 is up-sampled (930) to create an up-sampled base layer reconstructed picture 905, as is typically performed in a scalable video coding process for spatial scalability. In addition, according to the techniques of this disclosure, de-blocked base layer reconstructed picture 900 is also up-sampled with a low pass filter (935) to create a low-frequency up-sampled base layer reconstructed picture 910. Low-frequency up-sampled base layer reconstructed picture contains the low-frequency components of de-blocked base layer reconstructed picture 900.

The low-frequency up-sampled base layer reconstructed picture 910 can also be generated from the up-sampled base layer reconstructed picture 905 by applying a low pass filter on 905. As one example, in this case, the low pass filter can be a 3-tap 2D separable finite impulse response (FIR) filter [1 2 1]/4, or 5-tap 2D separable FIR filter [1 4 6 4 1]/16. In the case of FIG. 9A and FIG. 9B, the up-sampling low-pass filter can be generated by convolving a low-pass filter such as [1 2 1]/4 or [1 4 6 4 1]/16 with the up-sampling filter used in 930. In other parallel implementations, the high frequency up-sampled base layer reconstructed picture can be directly generated from 900 using a high pass up-sampling filter which can be obtained by convolving a high frequency filter with the up-sampling filter used in 930.

The low-frequency up-sampled base layer reconstructed picture 910 is then subtracted from the up-sampled base layer reconstructed picture 905 to form a high-frequency up-sampled base layer reconstructed picture 915. Essentially, the low-frequency component of the reconstructed base layer picture is subtracted from the reconstructed base layer picture to form a high-frequency component of the base layer picture. The high-frequency up-sampled base layer reconstructed picture correspond to the 'changed region' of FIG. 7D. SAO filtering (940) may then be applied to the high-frequency up-sampled base layer reconstructed picture 915 using SAO parameters 920. That is, SAO filtering is only applied to the high-frequency component. After SAO filtering is applied, the low-frequency up-sampled base layer reconstructed picture 910 (i.e., the low-frequency component) is added to the result of SAO filtering (i.e., the SAO filtered high-frequency component) to form the base layer reference picture 925.

FIG. 9B illustrates an example where HSAO is applied as in-loop filter, e.g., for H.264/AVC or HEVC applications, including multiview, scalable video coding, or 3D extensions. As illustrated in FIG. 9B, after the in-loop de-blocking filter, the de-blocked reconstructed picture 960 is low pass filtered (980), e.g., with a smoothing filter, to create a low-frequency reconstructed picture 965 (i.e., the low-frequency component of the reconstructed picture). The low-frequency reconstructed picture 965 is subtracted from the de-blocked reconstructed picture 960 to create a high-frequency reconstructed picture 970 (i.e., the high-frequency component of the reconstructed picture). SAO filtering (922) is then applied to the high-component of the reconstructed picture with SAO parameters 922. After SAO filtering, the low-frequency reconstructed picture 965 is added back to the SAO filtered high-frequency reconstructed picture 970 to generate the final decoded picture 970, which may be used to display and/or as reference picture.

In summary, the HSAO techniques of this disclosure may include obtaining a decoded block of video data, separating the decoded block of video data into a low-frequency component and a high-frequency component, applying a SAO filter to the high-frequency component to generate a SAO filtered high-frequency component, and combining the SAO filtered high-frequency component and the low-frequency component to generate a filtered decoded block of video data.

Figure 10:
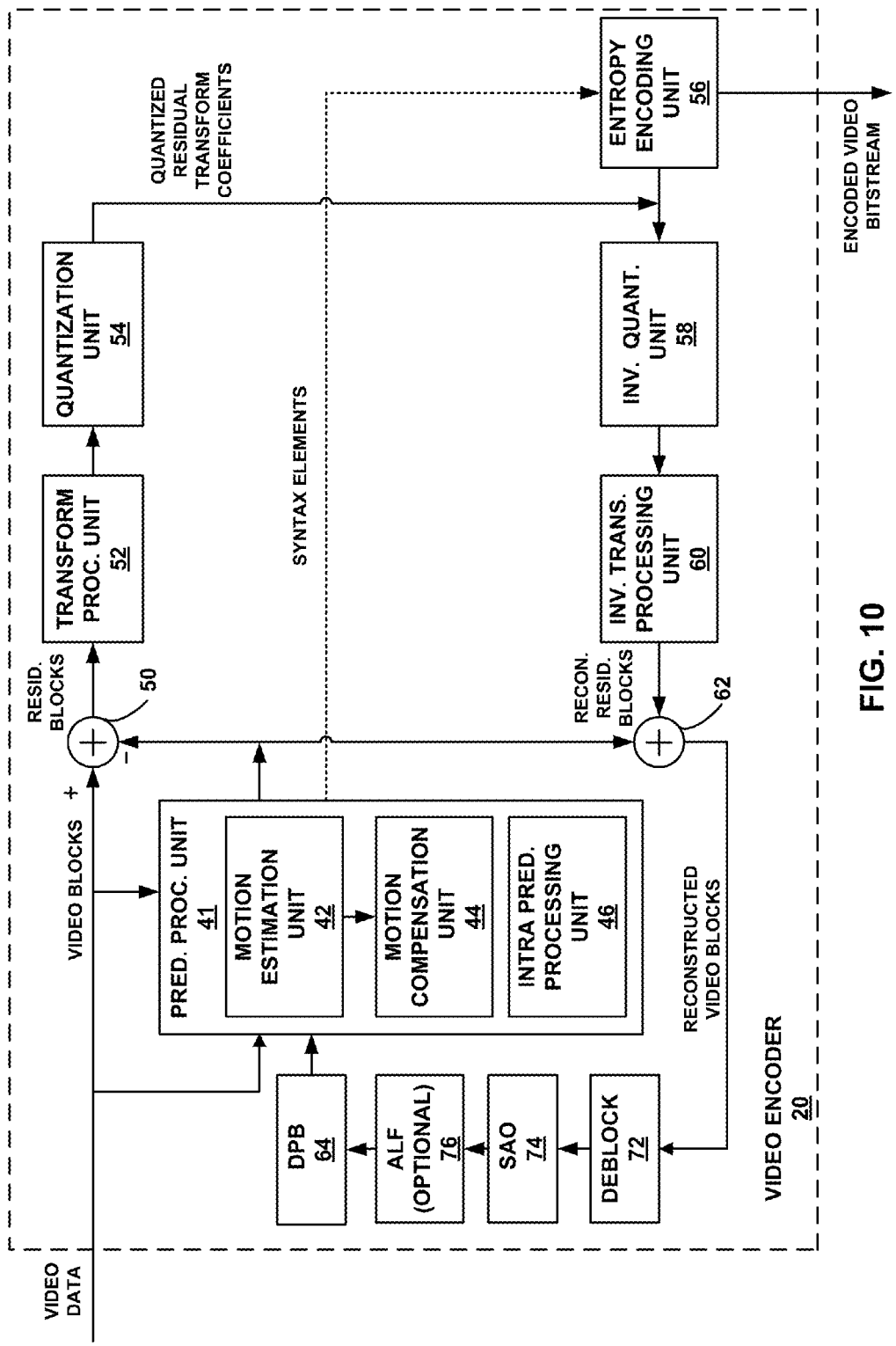
FIG. 10 is a block diagram illustrating an example video encoder that may implement the sample adaptive offset filtering techniques described in this disclosure.

FIG. 10 is a block diagram illustrating an example video encoder 20 that may implement the SAO filtering described in this disclosure. Video encoder 20 may be configured to encode video data according to any video encoding techniques, including HEVC and H.264/AVC, as well as scalable, multiview and 3D extensions of such standards. The example of FIG. 10 is explained with reference to HEVC. In this regard, the video encoding loop shown in FIG. 10 may be applied to each layer of a scalable video encoding process (i.e., base layers and enhancement layers), to each view of a multiview video coding process, or to both texture and depth views of a 3D video coding process.

Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 10, video encoder 20 includes, prediction processing unit 41, decoded picture buffer (DPB) 64, summer 50, transform processing unit 52, quantization unit 54, and entropy encoding unit 56. Prediction processing unit 41 includes motion estimation unit 42, motion compensation unit 44, and intra prediction processing unit 46. For video block reconstruction, video encoder 20 also includes inverse quantization unit 58, inverse transform processing unit 60, and summer 62. Deblocking filter 72 may also be included to filter block boundaries to remove blockiness artifacts from reconstructed video. As shown in FIG. 10, video encoder 20 also includes additional loop filters, including sample adaptive offset (SAO) filter 74 and an optional adaptive loop filter (ALF) 76. Although deblocking filter 72, SAO filter 74, and ALF 76 are shown as being in-loop filters in FIG. 10, in some configurations deblocking filter 72, SAO filter 74, and ALF 76 may be implemented as post-loop filters.

Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction processing unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as predicted slices (P slices), bi-direction predicted slices (B slices), or generalized P/B slices (GPB slices). Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in DPB 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in DPB 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra-prediction processing unit 46 may perform intra-prediction on a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 (or mode select unit 40, in some examples) may select an appropriate intra-prediction mode to use from the tested modes. For example, intra-prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via either inter-prediction or intra-prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in DPB 64.

Prior to storage in DPB 64, the reconstructed residual block can be filtered by one or more filters. In some examples, deblocking filter 72 may also be applied to filter the reconstructed residual blocks in order to remove blockiness artifacts. Other loop filters (either in the coding loop or after the coding loop) may also be used to smooth pixel transitions, or otherwise improve the video quality. One example of these other filter is SAO filter 74. The reference block may be used by motion estimation unit 42 and motion compensation unit 44 as a reference block to inter-predict a block in a subsequent video frame or picture.

SAO filter 74 may be configured to determine offset values for SAO filtering in a manner that improves video coding quality. Improving video coding quality may, for example, involve determining offset values that make a reconstructed image more closely match an original image. Video encoder 20 may, for example, code the video data using multiple passes with different offset values and choose, for inclusion in an encoded bitstream, the offset values that offer a desirable coding quality, as determined based on a rate-distortion calculation, for example.

In some configurations, SAO filter 74 is configured to apply two types of offset (e.g., band offset and edge offset) as described above. SAO filter 74 may also at times apply no offset, which can itself be considered a third type of offset. The type of offset applied by SAO filter 74 may be either explicitly or implicitly signaled to a video decoder. When applying edge offset, pixels can be classified based on edge information in accordance with FIG. 5 and a filter can be determined based on the edge classification. When applying band offset, SAO filter 74 can classify pixels into different bands based on a pixel value, such as an intensity value, with each band having an associated offset.

In addition, SAO filter 74 may be configured to employ the HSAO techniques of this disclosure, as described above with reference to FIG. 9A and FIG. 9B. In this way, video encoder 20 of FIG. 10 represents an example of a video encoder configured to obtain a decoded block of video data, separate the decoded block of video data into a low-frequency component and a high-frequency component, apply a SAO filter to the high-frequency component to generate a SAO filtered high-frequency component, and combine the SAO filtered high-frequency component and the low-frequency component to generate a filtered decoded block of video data.

Figure 11:
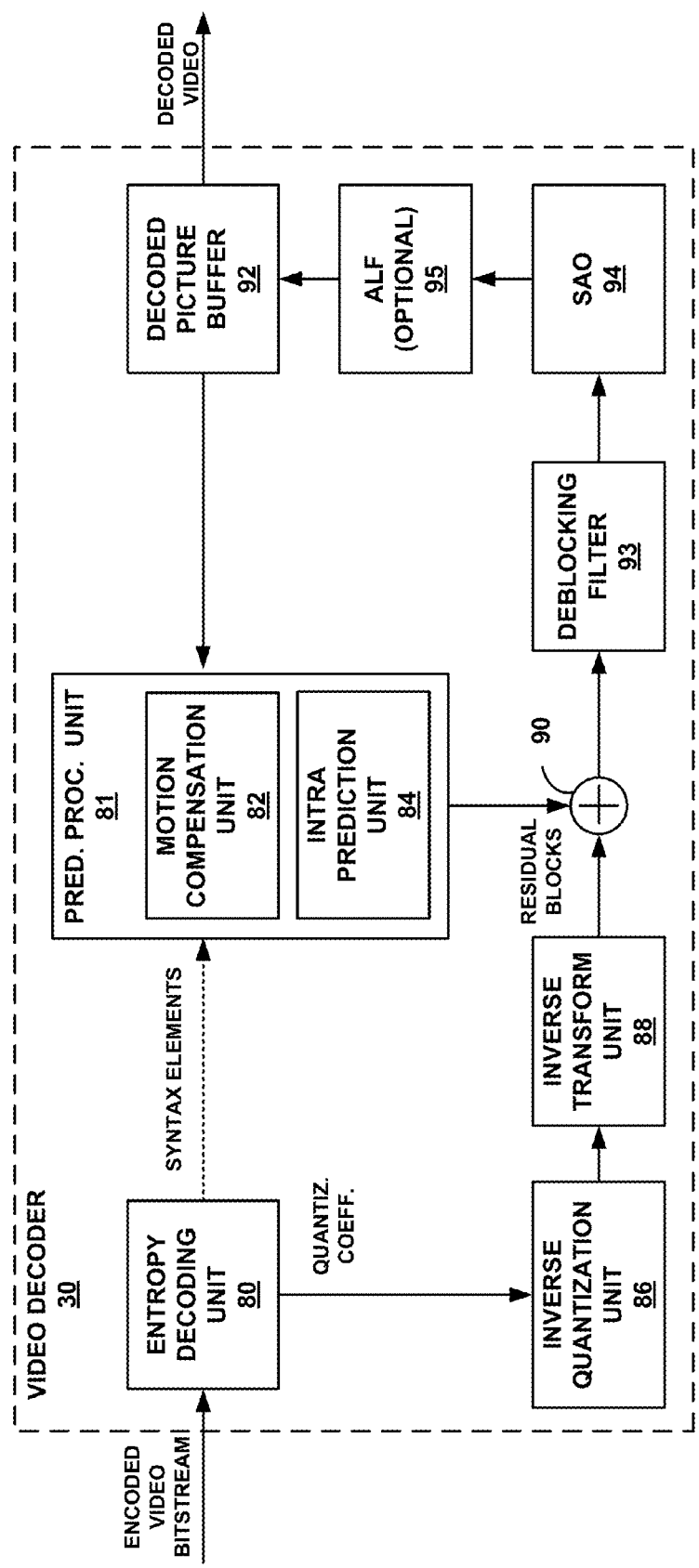
FIG. 11 is a block diagram illustrating an example video decoder that may implement the sample adaptive offset filtering techniques described in this disclosure.

FIG. 11 is a block diagram illustrating an example video decoder 30 that may implement the SAO techniques described in this disclosure. In the example of FIG. 8, video decoder 30 includes an entropy decoding unit 80, prediction processing unit 81, inverse quantization unit 86, inverse transformation unit 88, summer 90, and decoded picture buffer (DPB) 92. Prediction processing unit 81 includes motion compensation unit 82 and intra prediction processing unit 84. In some examples, video decoder 30 may perform a decoding pass generally reciprocal to the encoding pass described with respect to video encoder 20 from FIG. 10.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction processing unit 84 of prediction processing unit 81 may generate prediction data for a video block of the current video slice based on a signaled intra prediction mode and data from previously decoded blocks of the current frame or picture. When the video frame is coded as an inter-coded (e.g., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in DPB 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform processing unit 88 with the corresponding predictive blocks generated by motion compensation unit 82. Summer 90 represents the component or components that perform this summation operation. The decoded video blocks formed by summer 90 can then be filtered by a deblocking filter 93, SAO filter 94, and adaptive loop filter 95. The decoded video blocks in a given frame or picture are then stored in DPB 92, which stores reference pictures used for subsequent motion compensation. DPB 92 also stores decoded video for later presentation on a display device, such as display device 32 of FIG. 1. SAO filter 94 can be configured to apply the same filtering (e.g., edge offset and band offset) as SAO filter 74 discussed above.

In addition, SAO filter 94 may be configured to employ the HSAO techniques of this disclosure, as described above with reference to FIG. 9A and FIG. 9B. In this way, video decoder 30 of FIG. 11 represents an example of a video decoder configured to obtain a decoded block of video data, separate the decoded block of video data into a low-frequency component and a high-frequency component, apply a SAO filter to the high-frequency component to generate a SAO filtered high-frequency component, and combine the SAO filtered high-frequency component and the low-frequency component to generate a filtered decoded block of video data.

Aspects of SAO syntax will now be discussed in more detail. Video encoder 20 represents an example of a video coder configured to generate an encoded bit stream consistent with the syntax discussed below. Video decoder 30 represents an example of a video decoder configured to decode an encoded bitstream and parse syntax consistent with the syntax discussed below.

For each slice, two flags (slice_sao_luma_flag and slice_sao_chroma_flag) may be signaled in a slice header to indicate whether SAO parameters are available for all the LCUs within the slice. When either or both of these two flags are true, a set of SAO parameters is signaled for each LCU within the slice. Table 3 shows detailed syntax for signaling a set of SAO parameters for an LCU.

TABLE 3

| sao( rx, ry ) { | Descriptor |
|---|---|
|     if( rx > 0 ) { | |
|         leftCtbInSliceSeg = CtbAddrInSliceSeg > 0 | |
|         leftCtbInTile = TileId[ CtbAddrInTS ] = = TileId[ CtbAddrRStoTS[ CtbAddrInRS − 1 ] ] | |
|         if( leftCtbInSliceSeg && leftCtbInTile) | |
|             sao_merge_left_flag | ae(v) |
|     } | |
|     if( ry > 0 && !sao_merge_left_flag ) { | |
|         upCtbInSliceSeg = ( CtbAddrInRS − PicWidthInCtbsY ) >= slice_segment_address | |
|         upCtbInTile = TileId[ CtbAddrInTS ] = = TileId[ CtbAddrRStoTS[ CtbAddrInRS − PicWidthInCtbsY ] ] | |
|         if( upCtbInSliceSeg && upCtbInTile ) | |
|             sao_merge_up_flag | ae(v) |
|     } | |
|     if( !sao_merge_up_flag && !sao_merge_left_flag ) { | |
|         for( cIdx = 0; cIdx < 3; cIdx++ ) { | |
|             if( ( slice_sao_luma_flag && cIdx = = 0 ) \|\| ( slice_sao_chroma_flag && cIdx > 0 ) ) { | |
|                 if( cIdx = = 0 ) | |
|                     sao_type_idx_luma | ae(v) |
|                 if( cIdx = = 1 ) | |

TABLE 3-continued

```
sao( rx, ry ) {                                                              Descriptor
            sao_type_idx_chroma                                              ae(v)
            if( SaoTypeIdx[ cIdx ][ rx ][ ry ] != 0 ) {
                for( i = 0; i < 4; i++ )
                    sao_offset_abs[ cIdx ][ rx][ ry ][ i ]                   ae(v)
                if( SaoTypeIdx[ cIdx ][ rx ][ ry ] = = 1 ) {
                    for( i = 0; i < 4; i++ )
                        if( sao_offset_abs[ cIdx ][ rx ][ ry ][ i ] != 0 )
                            sao_offset_sign[ cIdx ][ rx ][ ry ][ i ]         ae(v)
                    sao_band_position[ cIdx ][ rx ][ ry ]                    ae(v)
                } else {
                    if( cIdx = = 0 )
                        sao_eo_class_luma                                    ae(v)
                    if( cIdx = = 1 )
                        sao_eo_class_chroma                                  ae(v)
                }
            }
        }
    }
}
```

Table 4 shows general slice segment header syntax.

TABLE 4

```
slice_segment_header( ) {                                                    Descriptor
    ...
    if( sample_adaptive_offset_enabled_flag ) {
        if(layer_id>1)
            if ( sao_prediction_vps_enable_flag[ layer_id ] )
                sao_prediciton_enlable_flag                                  u(1)
        slice_sao_luma_flag                                                  u(1)
        slice_sao_chroma_flag                                                u(1)
    }
    ...
    if( slice_segment_header_extension_present_flag ) {
        slice_segment_header_extension_length                                ue(v)
        for( i = 0; i < slice_segment_header_extension_length; i++)
            slice_segment_header_extension_data_byte[ i ]                    u(8)
    }
    byte_alignment( )
}
```

The syntax element "sao_prediciton_enlable_flag" set to 1 indicates that the inter-view prediction of SAO parameters may be enabled for CTUs in the current slice. The syntax element "sao_prediciton_enlable_flag" set to 1 indicates that the inter-view prediction of SAO parameters is disabled for any CTU in the current slice. When not present, this flag may be inferred to be equal to the syntax element "sao_prediction_vps_enable_flag[layer_id]," wherein layer_id is the layer identifier of the current slice (NAL unit). In some implementations, the syntax element "sao_prediciton_enlable_idc" instead of "sao_prediction_enlable_flag" may be signaled.

The syntax element "sao_prediciton_enlable_idc" set to 0 indicates that the inter-view prediction of SAO parameters is disabled for any CTU in the current slice. The syntax element "sao_prediciton_enlable_idc" set to 1 indicates that the inter-view prediction of SAO parameters may be enabled for CTUs in the current slice. The syntax element "sao_prediciton_enlable_idc" set to 2 indicates that the inter-view prediction of SAO parameters is always enabled for CTUs in the current slice. In some implementations, this flag may not be signaled and inferred to be equal to the syntax element "sao_prediction_vps_enable_flag[layer_id]."

Table 5 shows an example of coding tree unit syntax.

TABLE 5

```
coding_tree_unit( xCtb, yCtb ) {                                             Descriptor
    xCtb = ( CtbAddrRS % PicWidthInCtbsY ) << Log2CtbSizeY
    yCtb = ( CtbAddrRS / PicHeightInCtbsY ) << Log2CtbSizeY
    CtbAddrInSliceSeg = CtbAddrRS − slice_segment_address
    if( slice_sao_luma_flag | | slice_sao_chroma_flag )
        if ( sao_prediciton_enlable_flag )
            sao_merge_base_flag
        else
```

TABLE 5-continued

| coding_tree_unit( xCtb, yCtb ) { | Descriptor |
|---|---|
|     sao( xCtb >> Log2CtbSizeY, yCtb >> Log2CtbSizeY ) | |
|   coding_quadtree( xCtb, yCtb, Log2CtbSizeY, 0 ) | |
| } | |

Table 6 shows an example of CTU syntax where the SAO processing in a CTU level can be turned on or turned off based on a flag "sao_process_flag."

TABLE 6

| coding_tree_unit( xCtb, yCtb ) { | Descriptor |
|---|---|
|   xCtb = ( CtbAddrRS % PicWidthInCtbsY ) << Log2CtbSizeY | |
|   yCtb = ( CtbAddrRS / PicHeightInCtbsY ) << Log2CtbSizeY | |
|   CtbAddrInSliceSeg = CtbAddrInRS - slice segment address | |
|   if( slice_sao_luma_flag \|\| slice_sao_chroma_flag ) | |
|     if ( sao_prediciton_enlable_flag ) | |
|       sao_merge_base_flag | |
|     else { | |
|       sao_disable_flag | |
|       if(!sao_disable_flag) | |
|         sao( xCtb >> Log2CtbSizeY, yCtb >> Log2CtbSizeY ) | |
|     } | |
|   coding_quadtree( xCtb, yCtb, Log2CtbSizeY, 0 ) | |
| } | |

The syntax element "sao_merge_base_flag" set to 1 specifies that SAO parameters of the corresponding CTUs in the base view are used for the SAO of the current CTU, and the syntax elements "sao_type_idx_luma, sao_type_idx_chroma," "sao_band_position," "sao_eo_class_luma," "sao_eo_class_chroma," "sao_offset_abs" and "sao_offset_sign" are derived from the corresponding syntax elements of the corresponding coding tree blocks of the reference view component. The syntax element "sao_merge_base_flag" set to 0 indicates that SAO parameters of the corresponding CTUs are not used for the SAO of the current CTU and the SAO parameters of the current CTU are explicitly signaled in the sample adaptive offset syntax table. When not present, the syntax element "sao_merge_base_flag" may be inferred to be equal to 0.

The corresponding CTUs are in the reference view, which may be explicitly signaled or be the first reference view signaled as part of the view dependency in a video parameter set. In some implementations, however, only one or two components and/or partial SAO parameters can be shared among views.

The syntax element "sao_disable_flag" set to 1 specifies that the SAO parameters are not present for the CTU, and the syntax element "sao_disable_flag" set to 0 specifies that the SAO parameters are present in sample adaptive offset syntax table for the CTU.

In some implementations, the corresponding CTU in the view component of the reference view for the current CTU is explicitly signaled for the current CTU.

In some implementations, when multiple corresponding CTUs in the view component of the reference view for the current CTU are identified, the SAO parameter set of top-left CTU of the corresponding CTUs is used for the current CTU.

In some implementations, when multiple corresponding CTUs in the view component of the reference view for the current CTU are identified, the SAO parameter set of left CTU of the corresponding CTUs is used for the current CTU.

In some implementations, when multiple corresponding CTUs in the view component of the reference view for the current CTU are identified, the SAO parameter set of one specific CTU of the corresponding CTUs is used for the current CTU.

In some implementations, the merge mode can be signaled in a SAO syntax table as shown in Table 7.

TABLE 7

| sao( rx, ry ){ | Descriptor |
|---|---|
|   if( rx > 0 ) { | |
|     leftCtbInSliceSeg = CtbAddrInSliceSeg > 0 | |
|     leftCtbInTile = TileId[ CtbAddrInTS ] == | |
|   TileId[ CtbAddrRStoTS[ CtbAddrInRS - 1 ] ] | |
|     if( leftCtbInSliceSeg && leftCtbInTile ) | |
|       sao_merge_left_flag | ae(v) |
|   } | |
|   if( ry > 0 && !sao_merge_left_flag ) { | |
|     upCtbInSliceSeg = | |
| ( CtbAddrInRS - PicWidthInCtbsY ) >= slice_segment_address | |
|     upCtbInTile = TileId[ CtbAddrInTS ] == | |

TABLE 7-continued

| sao( rx, ry ){ | Descriptor |
|---|---|
|     TileId[ CtbAddrRStoTS[ CtbAddrInRS − PicWidthInCtbsY ] ]<br>        if( upCtbInSliceSeg && upCtbInTile )<br>            sao_merge_up_flag | ae(v) |
|     }<br>    if(!sao_merge_left_flag && !sao_merge_up_flag &&<br>sao_prediction_enable_flag)<br>        sao_merge_base_flag<br>    if( !sao_merge_up_flag && !sao_merge_left_flag &&!<br>sao_merge_base_flag) {<br>        for( cIdx = 0; cIdx < 3; cIdx++ ) {<br>            ...<br>    }<br>} | |

Aspects of an SAO process will now be discussed in more detail. Inputs of this process are the reconstructed picture sample arrays prior to sample adaptive offset recPicture$_L$, recPicture$_{Cb}$ and recPicture$_{Cr}$, which L, Cb, and Cr refer to luma, B-Y chroma, and R-Y chroma, respectively. Outputs of this process are the modified reconstructed picture sample arrays after sample adaptive offset saoPicture$_L$, saoPicture$_{Cb}$ and saoPicture$_{Cr}$. This process is performed on a coding tree block basis or picture basis after the completion of the deblocking filter process for the decoded picture. The following examples generally describe SAO being applied on a CTBbasis (also referred to as an LCU basis), although other blocks sizes may also be used.

The sample values in the modified reconstructed picture sample arrays after sample adaptive offset saoPicture$_L$, saoPicture$_{Cb}$ and saoPicture$_{Cr}$ are initially set equal to the sample values in the reconstructed picture sample arrays prior to sample adaptive offset recPicture$_L$, recPicture$_{Cb}$ and recPicture$_{Cr}$. The variables, Log 2CtbSizeY, CtbSizeY, PicWidthInCtbsY, and PicHeightInCtbsY may be set as follows.

$$\text{Log 2MinCbSizeY} = \text{log 2\_min\_luma\_coding\_block\_size\_minus3} + 3 \quad (1)$$

$$\text{Log 2CtbSizeY} = \text{Log 2MinCbSizeY} + \text{log 2\_diff\_max\_min\_luma\_coding\_block\_size} \quad (2)$$

$$\text{CtbSizeY} = 1 << \text{Log 2CtbSizeY} \quad (3)$$

$$\text{PicWidthInCtbsY} = \text{Ceil}(\text{pic\_width\_in\_luma\_samples} \div \text{CtbSizeY}) \quad (4)$$

$$\text{PicHeightInCtbsY} = \text{Ceil}(\text{pic\_height\_in\_luma\_samples} \div \text{CtbSizeY}) \quad (5)$$

For every coding tree unit with coding tree block location (rx, ry), where rx=0 . . . PicWidthInCtbsY−1 and ry=0 . . . PicHeightInCtbsY−1, the following may apply:

When slice_sao_luma_flag of the current slice is equal to 1, the coding tree block modification process as described above may be invoked with recPicture set equal to recPicture$_L$, cIdx set equal to 0, (rx, ry) and nS set equal to (1<<Log 2CtbSizeY) as inputs and the modified luma picture sample array saoPicture$_L$ as output.

When slice_sao_chroma_flag of the current slice is equal to 1, the coding tree block modification process as described above may be invoked with recPicture set equal to recPicture$_{Cb}$, cIdx set equal to 1, (rx, ry) and nS set equal to (1<<(Log 2CtbSizeY−1)) as inputs and the modified chroma picture sample array saoPicture$_{Cb}$ as output.

When slice_sao_chroma_flag of the current slice is equal to 1, the coding tree block modification process as described above may be invoked with recPicture set equal to recPicture$_{Cr}$, cIdx set equal to 2, (rx, ry) and nS set equal to (1<<(Log 2CtbSizeY−1)) as inputs and the modified chroma picture sample array saoPicture$_{Cr}$ as output.

A coding tree block modification process will now be described. Inputs to this process are:
picture sample array recPicture for the colour component cIdx,
a variable cIdx specifying colour component index,
a pair of variables (rx, ry) specifying the coding tree block location,
a coding tree block size nS.

Output of this process is a modified picture sample array saoPicture for the colour component cIdx.

The variable bitDepth is derived as follows.
If cIdx is equal to 0, bitDepth is set equal to BitDepthY.
Otherwise, bitDepth is set equal to BitDepth$_C$.
The variables xC and yC are set equal to rx*nS and ry*nS, respectively.

For i=0 . . . nS−1 and j=0 . . . nS−1, depending on the value of pcm_loop_filter_disable_flag, pcm_flag[xC+i][yC+j], and cu_transquant_bypass_flag of the coding unit which includes the coding block covering recPicture[xC+i][yC+j], the following applies:

If one or more of the following conditions are true, saoPicture[xC+i][yC+j] is not modified.
    pcm_loop_filter_disable_flag and pcm_flag[xC+i][yC+j] are both equal to 1.
    cu_transquant_bypass_flag is equal to 1.
    SaoTypeIdx[cIdx][rx][ry] is equal to 0.

Otherwise, if SaoTypeIdx[cIdx][rx][ry] is equal to 2, i.e. edge offset, the following ordered steps apply:
1. The values of hPos[k] and vPos[k] for k=0 . . . 1 are specified in Table 1 based on SaoEoClass[cIdx][rx][ry].
2. The variable edgeIdx is derived as follows.
    If one or more of the following conditions for (xS, xS)=(xC+i+hPos[k], yC+j+vPos[k]), k=0 . . . 1 are true, edgeIdx is set equal to 0.
        The sample at location (xS, yS) is outside picture boundary
        The sample at location (xS, yS) belongs to a different slice and one of the following two conditions is true:
            MinTbAddrZS[xS>>Log 2MinTrafoSize][yS>>Log 2MinTrafoSize] is less than MinTbAddrZS[(xC+i)>>Log 2MinTrafoSize][(yC+ j)>>Log 2MinTrafoSize] and slice_loop_filter_across_slices_enabled_flag in the slice which the sample recPicture[xC+i][yC+j] belongs to is equal to 0. MinTbAddrZS[(xC+i)>>Log 2MinTrafoSize][(yC+j)>>Log 2MinTrafoSize] is less than MinTbAddrZS[xS>>Log 2MinTrafoSize][yS>>Log 2MinTrafoSize] and slice_loop_filter_across_slices_enabled_flag in the slice which the sample recPicture[xS][yS] belongs to is equal to 0.

loop_filter_across_tiles_enabled_flag is equal to 0 and the sample at location (xS, yS) belongs to a different tile.

Otherwise, edgeIdx is derived as follows.

edgeIdx=2+Σ$_k$(Sign(recPicture[xC+i][yC+j]−recPicture[xC+i+hPos[k]][yC+j+vPos[k]])) with k=0 . . . 1     (6)

When edgeIdx is equal to 0, 1, or 2, it is modified as follows.

edgeIdx=(edgeIdx==2)?0:(edgeIdx+1)     (7)

3. The modified picture sample array saoPicture[xC+i][yC+j] is derived as follows.

saoPicture[xC+i][yC+j]=Clip3(0,(1<<bitDepth)−1, recPicture[xC+i][yC+j]+SaoOffsetVal[cIdx][rx][ry][edgeIdx])     (8)

Otherwise (SaoTypeIdx[cIdx][rx][ry] is equal to 1, i.e. band offset), the following ordered steps apply:
1. The variable bandShift is set equal to bitDepth−5.
2. The variable saoLeftClass is set equal to sao_band_position[cIdx][rx][ry].
3. The list bandTable is defined with 32 elements and all elements are initially set to 0. Then, four of its elements (indicating the starting position of bands for explicit offsets) are modified as follows.
for (k=0; k<4; k++)

bandTable[(k+saoLeftClass)&31]=k+1     (9)

4. The variable bandIdx is set equal to bandTable[recPicture[xC+i][yC+j]>>bandShift]     (10)

5. The modified picture sample array saoPicture[xC+i][yC+j] is derived as follows.

saoPicture[xC+i][yC+j]=Clip3(0,(1<<bitDepth)−1, recPicture[xC+i][yC+j]+SaoOffsetVal[cIdx][rx][ry][bandIdx])     (11)

Table 8 shows an example of specification of hPos and vPos according to the sample adaptive offset class.

TABLE 8

| SaoEoClass[ cIdx ][ rx ][ ry ] | 0 | 1 | 2 | 3 |
|---|---|---|---|---|
| hPos[0] | −1 | 0 | −1 | 1 |
| hPos[1] | 1 | 0 | 1 | −1 |
| vPos[0] | 0 | −1 | −1 | −1 |
| vPos[1] | 0 | 1 | 1 | 1 |

A sample adaptive offset process summary will now be provided. In HEVC, SAO process applies to coding tree block (CTB) to reduce the encoding delay. When encoding delay is not one of the primary concerns, sample adaptive offset process can be applied to the whole picture, which can greatly reduce the parameter signaling overhead.

In HEVC, each CTB can only select one type from: band offset, edge offset, and none, i.e. SaoTypeIdx[cIdx][rx][ry]. If SaoTypeIdx[cIdx][rx][ry] equals to 0, sample adaptive offset process is turned off. If SaoTypeIdx[cIdx][rx][ry] equals to 1, band offset process is enabled, the band offset process can only correct 4 consecutive bands. If SaoTypeIdx[cIdx][rx][ry] equals to 2, edge offset process is enabled, the band offset process can only correct Gibbs fluctuations along one single direction.

The sample adaptive offset process is applied pixel by pixel. First, for edge offset case, a pixel is classified into 5 different categories based on the relative pixel values among itself and its two neighbors along the specified edge offset direction (edge offset type). For the band offset case, a pixel is classified using its own value. Then an offset is applied to the pixel according to the offset value corresponding to the category explicitly signaled in the bitstream.

As explained above, in HSAO, the filter focuses on the 'changed region' of a video block or pictures. In some cases, the 'unchanged region' is very small, compared with the 'changed region'. In these cases, the low-frequency component which would be extracted is very small, i.e., the difference between the 'changed region' and the whole frequency band is small. The difference between HSAO and SAO may not significant, while HSAO requires additional computation to perform low pass filter. Therefore, this disclosure also proposes techniques whereby HSAO and SAO can be adaptively triggered. The syntax that allows HSAO and SAO to be adaptively trigged may be designed according to Tables 9 and 10 below.

TABLE 9

| seq_parameter_set_rbsp( ) { | Descriptor |
|---|---|
| sps_video_parameter_set_id | u(4) |
| sps_max_sub_layers_minus1 | u(3) |
| sps_temporal_id_nesting_flag | u(1) |
| profile_tier_level( 1, sps_max_sub_layers_minus1 ) | |
| sps_seq_parameter_set_id | ue(v) |
| chroma_format_idc | ue(v) |
| if( chroma_format_idc = = 3 ) | |
|     separate_colour_plane_flag | u(1) |
| pic_width_in_luma_samples | ue(v) |
| pic_height_in_luma_samples | ue(v) |
| conformance_window_flag | u(1) |
| if( conformance_window_flag ) { | |
|     conf_win_left_offset | ue(v) |
|     conf_win_right_offset | ue(v) |
|     conf_win_top_offset | ue(v) |
|     conf_win_bottom_offset | ue(v) |
| } | |

TABLE 9-continued

| seq_parameter_set_rbsp( ) { | Descriptor |
|---|---|
|     bit_depth_luma_minus8 | ue(v) |
|     bit_depth_chroma_minus8 | ue(v) |
|     log2_max_pic_order_cnt_lsb_minus4 | ue(v) |
|     sps_sub_layer_ordering_info_present_flag | u(1) |
|     for( i = ( sps_sub_layer_ordering_info_present_flag ? | |
|         0 : sps_max_sub_layers_minus1 ); | |
|         i <= sps_max_sub_layers_minus1; i++) { | |
|         sps_max_dec_pic_buffering[ i ] | ue(v) |
|         sps_max_num_reorder_pics[ i ] | ue(v) |
|         sps_max_latency_increase[ i ] | ue(v) |
|     } | |
|     log2_min_luma_coding_block_size_minus3 | ue(v) |
|     log2_diff_max_min_luma_coding_block_size | ue(v) |
|     log2_min_transform_block_size_minus2 | ue(v) |
|     log2_diff_max_min_transform_block_size | ue(v) |
|     max_transform_hierarchy_depth_inter | ue(v) |
|     max_transform_hierarchy_depth_intra | ue(v) |
|     scaling_list_enable_flag | u(1) |
|     if( scaling_list_enable_flag ) { | |
|         sps_scaling_list_data_present_flag | u(1) |
|         if( sps_scaling_list_data_present_flag ) | |
|             scaling_list_data( ) | |
|     } | |
|     amp_enabled_flag | u(1) |
|     sample_adaptive_offset_enabled_flag | u(1) |
|     pcm_enabled_flag | u(1) |
|     if( pcm_enabled_flag ) { | |
|         pcm_sample_bit_depth_luma_minus1 | u(4) |
|         pcm_sample_bit_depth_chroma_minus1 | u(4) |
|         log2_min_pcm_luma_coding_block_size_minus3 | ue(v) |
|         log2_diff_max_min_pcm_luma_coding_block_size | ue(v) |
|         pcm_loop_filter_disable_flag | u(1) |
|     } | |
|     num_short_term_ref_pic_sets | ue(v) |
|     for( i = 0; i < num_short_term_ref_pic_sets; i++) | |
|         short_term_ref_pic_set( i ) | |
|     long_term_ref_pics_present_flag | u(1) |
|     if( long_term_ref_pics_present_flag ) { | |
|         num_long_term_ref_pics_sps | ue(v) |
|         for( i = 0; i < num_long_term_ref_2pics_sps; i++ ) { | |
|             lt_ref_pic_poc_lsb_sps[ i ] | u(v) |
|             used_by_curr_pic_lt_sps_flag[ i ] | u(1) |
|         } | |
|     } | |
|     sps_temporal_mvp_enable_flag | u(1) |
|     strong_intra_smoothing_enable_flag | u(1) |
|     sps_hsao_luma_enable_flag | u(1) |
|     if(sps_hsao_luma_enable_flag) | |
|         sps_be_hsao_luma | u(1) |
|     sps_hsao_chroma_enable_flag | u(1) |
|     if(sps_hsao_chroma_enable_flag) | |
|         sps_be_hsao_chroma | u(1) |
|     vui_parameters_present_flag | u(1) |
|     if( vui_parameters_present_flag ) | |
|         vui_parameters( ) | |
|     sps_extension_flag | u(1) |
|     if( sps_extension_flag ) | |
|         while( more_rbsp_data( ) ) | |
|             sps_extension_data_flag | u(1) |
|     rbsp_trailing_bits( ) | |
| } | |

TABLE 10

| adaptive_sao(rx, ry) { | Descriptor |
|---|---|
| if(!sps_hsao_luma_enable_flag) | |
|     be_hsao_luma | ae(v) |
| if(!sps_hsao_chroma_enable_flag) | |
|     be_hsao_chroma | ae(v) |
|     for( cIdx = 0; cIdx < 3; cIdx++ ) { | |
|         if( cIdx = = 0 ) | |
|             sao_type_idx_luma | ae(v) |

TABLE 10-continued

| adaptive_sao(rx, ry) { | Descriptor |
|---|---|
|     else if( cIdx = = 1 ) | |
|         sao_type_idx_chroma | ae(v) |
|     if( SaoTypeIdx[ cIdx ][ rx ][ ry ] != 0 ) { | |
|         for( i = 0; i < 4; i++ ) | |
|             sao_offset_abs[ cIdx ][ rx][ ry ][ i ] | ae(v) |
|         if( SaoTypeIdx[ cIdx ][ rx ][ ry ] = = 1 ) { | |
|             for( i = 0; i < 4; i++ ) | |
|                 if( sao_offset_abs[ cIdx ][ rx ][ ry ][ i ] != 0 ) | |
|                     sao_offset_sign[ cIdx ][ rx ][ ry ][ i ] | ae(v) |
|         sao_band_position [ cIdx ][ rx ][ ry ] | ae(v) |
|     } else { | |
|         if( cIdx = = 0 ) | |
|             sao_eo_class_luma | ae(v) |
|         if( cIdx = = 1 ) | |
|             sao_eo_class_chroma | ae(v) |
|     } | |
|     } | |
| } | |

In the example designs illustrated in Tables 9 and 10, sps_hsao_luma_enable_flag=1 specifies the whole sequence's luma component's SAO choice is based on sps_be_hsao_luma. When sps_hsao_luma_enable_flag=0, each picture's luma component's SAO choice is signaled separately using be_hsao_luma. sps_hsao_chroma_enable_flag=1 specifies the whole sequence's chroma component's SAO choice is based on sps_be_hsao_chroma. When sps_hsao_chroma_enable_flag=0, each picture's chroma component's SAO choice is signaled separately using be_hsao_chroma. sps_be_hsao_luma and be_hsao_luma specifies whether HSAO is used for the luma plane. When be_hsao_luma=1, HSAO is used for the luma plane of the current picture. When be_hsao_luma=0, SAO is used for the luma component of the current picture. When sps_be_hsao_luma=1, HSAO is used for the luma plane of the sequence. When sps_be_hsao_luma=0, SAO is used for the luma component of the sequence. sps_hsao_chroma and be_hsao_chroma specifies whether HSAO is used for the chroma plane. When be_hsao_chroma=1, HSAO is used for the chroma plane of the current picture. When be_hsao_chroma=0, SAO is used for the chroma component of the current picture. When sps_be_hsao_chroma=1, HSAO is used for the chroma plane of the sequence. When sps_be_hsao_chroma=0, SAO is used for the chroma component of the sequence.

Cascading multiple rounds of SAO can improve coding efficiency. To enable this scenario, the syntax can be designed according to Table 11.

TABLE 11

| cascade_hsao(rx, ry) { | Descriptor |
|---|---|
|     sao_rounds | ae(v) |
|     for(sIdx=0; sIdx<sao_rounds; sIdx++) { | |
|         if(!sps_hsao_luma_enable_flag) | |
|             be_hsao_luma | ae(v) |
|         If(!sps_hsao_chroma_enable_flag) | |
|             be_hsao_chroma | ae(v) |
| } | |
|     for( rIdx = 0; rIdx < sao_rounds; rIdx++) | |
|         for( cIdx = 0; cIdx < 3; cIdx++ ) { | |
|             if( cIdx = = 0 ) | |
|                 sao_type_idx_luma | ae(v) |
|             else_if( cIdx = = 1 ) | |
|                 sao_type_idx_chroma | ae(v) |
|             if( SaoTypeIdx[ cIdx ][ rx ][ ry ] != 0 ) { | |
|                 for( i = 0; i < 4; i++ ) | |
|                     sao_offset_abs[ cIdx ][ rx][ ry ][ i ] | ae(v) |
|                 if( SaoTypeIdx[ cIdx ][ rx ][ ry ] = = 1 ) { | |
|                     for( i = 0; i < 4; i++ ) | |
|                           if( sao_offset_abs[ cIdx ][ rx ][ ry ][ i ] != 0 ) | |
|                               sao_offset_sign[ cIdx ][ rx ][ ry ][ i ] | ae(v) |
|                     sao_band_position [ cIdx ][rx ][ ry ] | ae(v) |
|                 } else { | |
|                     if( cIdx = = 0 ) | |
|                         sao_eo_class_luma | ae(v) |
|                     if( cIdx = = 1 ) | |
|                         sao_eo_class_chroma | ae(v) |
|                 } | |
|             } | |
|         } | |
| } | |

In the example illustrated in Table 11, sao_rounds specifies the number of times SAO is applied (i.e., cascaded).

The smoothing filter (i.e., low-pass filter) used in HSAO can be flexible designed and better separate the 'unchanged region' and the 'changed region' for different sequences. The filter can be signaled in sequence parameter set because it reflects the spectrum character of the sequence, thus be relative stable. Table 12 provides an example design of an adaptive low pass filter.

TABLE 12

| seq_parameter_set_rbsp( ) { | Descriptor |
|---|---|
|     sps_video_parameter_set_id | u(4) |
|     sps_max_sub_layers_minus1 | u(3) |
|     sps_temporal_id_nesting_flag | u(1) |
|     profile_tier_level( 1, sps_max_sub_layers_minus1 ) | |
|     sps_seq_parameter_set_id | ue(v) |
|     chroma_format_idc | ue(v) |
|     if( chroma_format_idc = = 3 ) | |
|         separate_colour_plane_flag | u(1) |
|     pic_width_in_luma_samples | ue(v) |
|     pic_height_in_luma_samples | ue(v) |
|     conformance_window_flag | u(1) |
|     if( conformance_window_flag ) { | |
|         conf_win_left_offset | ue(v) |
|         conf_win_right_offset | ue(v) |
|         conf_win_top_offset | ue(v) |
|         conf_win_bottom_offset | ue(v) |
|     } | |
|     bit_depth_luma_minus8 | ue(v) |
|     bit_depth_chroma_minus8 | ue(v) |
|     log2_max_pic_order_cnt_lsb_minus4 | ue(v) |
|     sps_sub_layer_ordering_info_present_flag | u(1) |
|     for( i = ( sps_sub_layer_ordering_info_present_flag ? | |
|         0 : sps_max_sub_layers_minus1 ); | |
|         i <= sps_max_sub_layers_minus1; i++) { | |
|         sps_max_dec_pic_buffering[ i ] | ue(v) |
|         sps_max_num_reorder_pics[ i ] | ue(v) |
|         sps_max_latency_increase[ i ] | ue(v) |
|     } | |
|     log2_min_luma_coding_block_size_minus3 | ue(v) |
|     log2_diff_max_min_luma_coding_block_size | ue(v) |
|     log2_min_transform_block_size_minus2 | ue(v) |
|     log2_diff_max_min_transform_block_size | ue(v) |
|     max_transform_hierarchy_depth_inter | ue(v) |
|     max_transform_hierarchy_depth_intra | ue(v) |
|     scaling_list_enable_flag | u(1) |
|     if( scaling_list_enable_flag ) { | |
|         sps_scaling_list_data_present_flag | u(1) |
|         if( sps_scaling_list_data_present_flag ) | |
|             scaling_list_data( ) | |
|     } | |
|     amp_enabled_flag | u(1) |
|     sample_adaptive_offset_enabled_flag | u(1) |
|     pcm_enabled_flag | u(1) |
|     if( pcm_enabled_flag ) { | |
|         pcm_sample_bit_depth_luma_minus1 | u(4) |
|         pcm_sample_bit_depth_chroma_minus1 | u(4) |
|         log2_min_pcm_luma_coding_block_size_minus3 | ue(v) |
|         log2_diff_max_min_pcm_luma_coding_block_size | ue(v) |
|         pcm_loop_filter_disable_flag | u(1) |
|     } | |
|     num_short_term_ref_pic_sets | ue(v) |
|     for( i = 0; i < num_short_term_ref_pic_sets; i++) | |
|         short_term_ref_pic_set( i ) | |
|     long_term_ref_pics_present_flag | u(1) |
|     if( long_term_ref_pics_present_flag ) { | |
|         num_long_term_ref_pics_sps | ue(v) |
|         for( i = 0; i < num_long_term_ref_pics_sps; i++ ) { | |
|             lt_ref_pic_poc_lsb_sps[ i ] | u(v) |
|             used_by_curr_pic_lt_sps_flag[ i ] | u(1) |
|         } | |
|     } | |
|     sps_temporal_mvp_enable_flag | u(1) |
|     strong_intra_smoothing_enable_flag | u(1) |
|     hsao_tap_luma_num | ue(v) |
|     for(lIdx=0; lIdx< hsao_tap_luma_num; lIdx++) | |
|         hsao_luma[lIdx] | ue(v) |
|     hsao_tap_chroma_num | ue(v) |
|     for(cIdx=0; cIdx< hsao_tap_chroma_num; cIdx++) | |
|         hsao_chroma[cIdx] | ue(v) |
|     vui_parameters_present_flag | u(1) |
|     if( vui_parameters_present_flag ) | |
|         vui_parameters( ) | |

TABLE 12-continued

| seq_parameter_set_rbsp( ) { | Descriptor |
|---|---|
|    sps_extension_flag | u(1) |
|    if( sps_extension_flag ) | |
|       while( more_rbsp_data( ) ) | |
|          sps_extension_data_flag | u(1) |
|    rbsp_trailing_bits( ) | |
| } | |

In the example illustrated in Table 12, hsao_tap_luma_num and hsao_tap_chroma_num specifies the number of taps for luma and chroma in HSAO. hsaoluma[lIdx] and hsao_chroma[cIdx] are filter coefficients.

The bit depth of the "High frequency up-sampled Base layer reconstructed picture" may be greater than the bit depth specified the SPS. To maintain the same bit depth as specified in the SPS (bit_depth_luma_minus8), an offset could be added and clipped to specified bit depth range. For example, when we code luma 8-bit samples (bit_depth_luma_minus8==16), the dynamic range of current picture is [0, 255], then the dynamic range of high frequency picture is [−255, 255] requiring more storage memory. In order to not increase the internal bit depth, it is proposed to add a constant offset to the difference signal and clip the value to the same dynamic range as original picture. As an example, 128 could be added and the pixel value clipped to [0, 255].

It should be noted that HSAO can be applied to SNR scalability as well.

Figure 12:
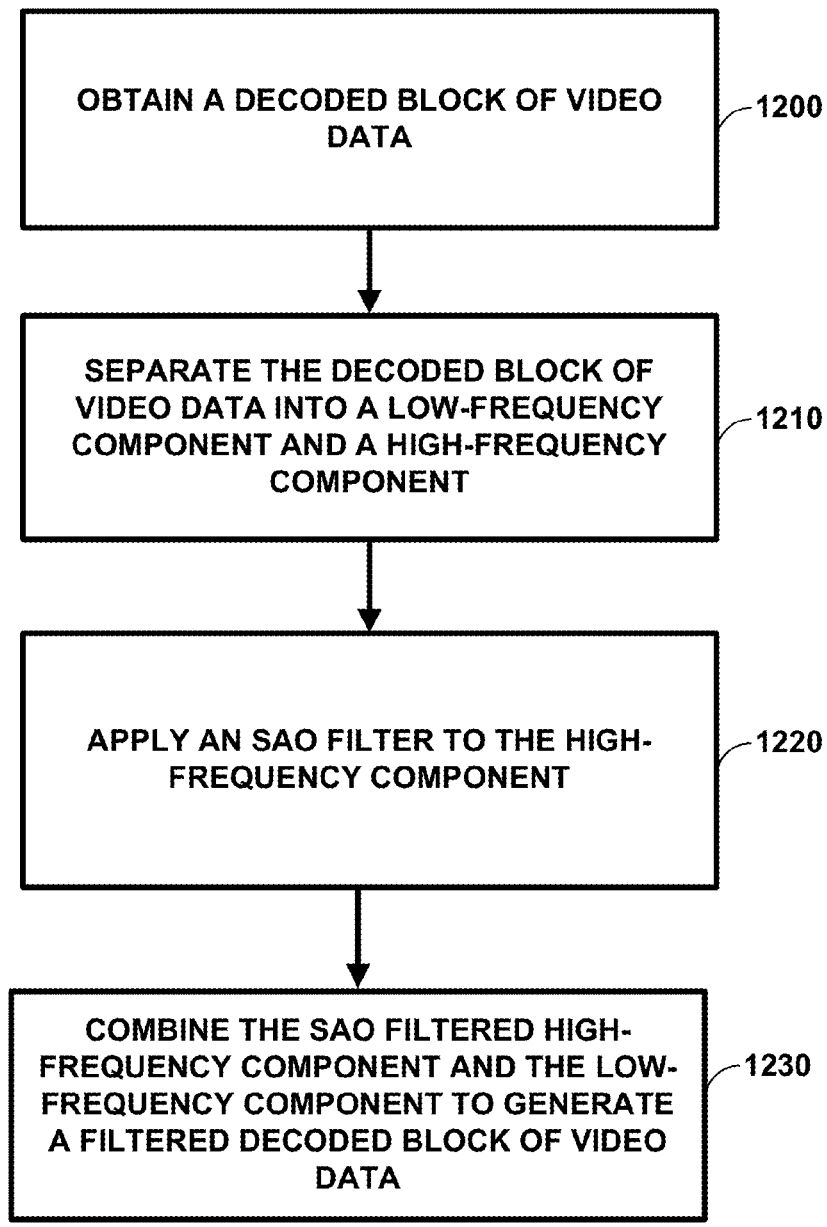
FIG. 12 is a flowchart showing an example method according to the techniques of the disclosure.

FIG. 12 is a flowchart showing an example method according to the techniques of the disclosure. Video encoder 20 and video decoder 30 may be configured to implement the techniques of FIG. 12. In particular, one or more functional units of video encoder 20 and video decode 30, including SAO filter unit 74 and SAO filter unit 94.

In one example of the disclosure, video encoder 20 and/or video decoder 30 are configured to obtain a decoded block of video data (1200), and separate the decoded block of video data into a low-frequency component and a high-frequency component (1210). Video encoder 20 and/or video decoder 30 may be further configured to apply a sample adaptive offset (SAO) filter to the high-frequency component to generate a SAO filtered high-frequency component (1220), and combine the SAO filtered high-frequency component and the low-frequency component to generate a filtered decoded block of video data (1230).

In one example of the disclosure, video encoder 20 and/or video decoder 30 may be further configured to deblock the decoded block of video data prior to separating the decoded block of video data into the low-frequency component and the high-frequency component.

In one example of the disclosure, video encoder 20 and/or video decoder 30 are configured to obtain the decoded block of a video data by one of decoding an encoded block of video in a video decoding process to obtain the decoded block of video data, and reconstructing an encoded block of a video data in a reconstruction loop of a video encoding process to obtain the decoded block of video data. In this example, separating the decoded block of video data into a low-frequency component and a high-frequency component may comprise applying a low pass filter to the decoded block of video data to produce at the low-frequency component, and subtracting the low-frequency component from the decoded block of video data to produce the high-frequency component. In one example, the low pass filter is a smoothing filter.

In another example of the disclosure, video encoder 20 and/or video decoder 30 may be configured to obtain the decoded block of a video data by one of decoding an encoded block of video in a scalable video decoding process to obtain the decoded block of video data, and reconstructing an encoded block of a video data in a reconstruction loop of a scalable video encoding process to obtain the decoded block of video data, and wherein the decoded block of video data is in a base layer. In this example, separating the decoded block of video data into a low-frequency component and a high-frequency component comprises applying an upsampling filter to the decoded block of video data to produce an upsampled block of video data, applying a low-pass upsampling filter to the decoded block of video data to produce the low-frequency component, and subtracting the low-frequency component from the upsampled block of video data to produce the high-frequency component.

In each of the above examples, video encoder 20 and/or video decoder 30 may be further configured to output the filtered decoded block of video data to a display, and/or use the filtered decoded block of video data as a reference video block.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for coding video data, the method comprising:
   receiving an encoded block of video data;
   decoding or reconstructing the encoded block of video data to produce a decoded block of video data;
   applying a low-pass filter to the decoded block of video data to produce a low-frequency component;
   subtracting the low-frequency component from the decoded block of video data to produce a high-frequency component;
   applying a sample adaptive offset (SAO) filter to the high-frequency component to generate a SAO filtered high-frequency component;
   combining the SAO filtered high-frequency component and the low-frequency component to generate a filtered decoded block of video data; and
   outputting the filtered decoded block of video data.

2. The method of claim 1, further comprising:
   deblocking the decoded block of video data prior to applying the low-pass filter.

3. The method of claim 1, wherein the low-pass low pass filter is a smoothing filter.

4. The method of claim 1, wherein decoding or reconstructing the decoded block of video data comprises one of decoding the encoded block of video data in a scalable video decoding process, or reconstructing the encoded block of video data in a reconstruction loop of a scalable video encoding process, and wherein the decoded block of video data is in a base layer.

5. The method of claim 4, further comprising:
   applying an upsampling filter to the decoded block of video data to produce an upsampled block of video data,
   wherein the low-pass filter is a low-pass upsampling filter, and
   wherein subtracting the low-frequency component from the decoded block of video data to produce the high-frequency component comprises subtracting the low-frequency component from the upsampled block of video data to produce the high-frequency component.

6. The method of claim 1, further comprising outputting the filtered decoded block of video data to a display.

7. The method of claim 1, further comprising using the filtered decoded block of video data as a reference video block.

8. The method of claim 1, wherein coding video data comprises decoding video data.

9. The method of claim 1, wherein coding video data comprises encoding video data.

10. An apparatus configured to code video data, the apparatus comprising:
    a memory configured to store a decoded block of video data; and
    video coding circuitry configured to:
      receive an encoded block of video data;
      decode or reconstruct the encoded block of video data to produce the decoded block of video data;
      apply a low-pass filter to the decoded block of video data to produce a low-frequency component;
      subtract the low-frequency component from the decoded block of video data to produce a high-frequency component;
      apply a sample adaptive offset (SAO) filter to the high-frequency component to generate a SAO filtered high-frequency component;
      combine the SAO filtered high-frequency component and the low-frequency component to generate a filtered decoded block of video data; and
      output the filtered decoded block of video data.

11. The apparatus of claim 10, wherein the video coding circuitry is further configured to:
    deblock the decoded block of video data prior to applying the low-pass filter.

12. The apparatus of claim 10, wherein the low-pass filter is a smoothing filter.

13. The apparatus of claim 10, wherein the video coding circuitry is further configured to decode the encoded block of video data in a scalable video decoding process, or reconstruct the encoded block of video data in a reconstruction loop of a scalable video encoding process, and wherein the decoded block of video data is in a base layer.

14. The apparatus of claim 13, wherein the video coding circuitry is further configured to:
    apply an upsampling filter to the decoded block of video data to produce an upsampled block of video data,
    wherein the low-pass filter is a low-pass upsampling filter, and
    wherein to subtract the low-frequency component from the decoded block of video data to produce the high-frequency component the video coding circuitry is further configured to subtract the low-frequency component from the upsampled block of video data to produce the high-frequency component.

15. The apparatus of claim 10, wherein the video coding circuitry is further configured to output the filtered decoded block of video data to a display.

16. The apparatus of claim 10, wherein the video coding circuitry is further configured to use the filtered decoded block of video data as a reference video block.

17. The apparatus of claim 10, wherein the video coding circuitry is video encoder circuitry.

18. The apparatus of claim 10, wherein the video coding circuitry is video decoder circuitry.

19. An apparatus configured to code video data, the apparatus comprising:
   means for receiving an encoded block of video data;
   means for decoding or reconstructing the encoded block of video data to produce a decoded block of video data;
   means for applying a low-pass filter to the decoded block of video data to produce a low-frequency component;
   means for subtracting the low-frequency component from the decoded block of video data to produce a high-frequency component;
   means for applying a sample adaptive offset (SAO) filter to the high-frequency component to generate a SAO filtered high-frequency component;
   means for combining the SAO filtered high-frequency component and the low-frequency component to generate a filtered decoded block of video data; and
   means for outputting the filtered decoded block of video data.

20. The apparatus of claim 19, further comprising:
   means for applying an upsampling filter to the decoded block of video data to produce an upsampled block of video data,
   wherein the low-pass filter is a low-pass upsampling filter, and
   wherein the means for subtracting the low-frequency component from the decoded block of video data to produce the high-frequency component comprises means for subtracting the low-frequency component from the upsampled block of video data to produce the high-frequency component.

21. A non-transitory computer-readable storage medium storing instructions that, when executed, cause one or more processors of a device to code video data to:
   receive an encoded block of video data;
   decode or reconstruct the encoded block of video data to produce a decoded block of video data;
   apply a low-pass filter to the decoded block of video data to produce a low-frequency component;
   subtract the low-frequency component from the decoded block of video data to produce a high-frequency component;
   apply a sample adaptive offset (SAO) filter to the high-frequency component to generate a SAO filtered high-frequency component;
   combine the SAO filtered high-frequency component and the low-frequency component to generate a filtered decoded block of video data; and
   output the filtered decoded block of video data.

22. The method of claim 1, further comprising:
   receiving the video data at a receiver of a wireless communication device;
   storing the video data in a memory of the wireless communication device; and
   processing the video data on one or more processors of the wireless communication device.

23. The method of claim 22, wherein the wireless communication device comprises a telephone handset and wherein receiving the video data at the receiver of the wireless communication device comprises demodulating, according to a wireless communication standard, a signal comprising the video data.

24. The apparatus of claim 10, wherein the device comprises a wireless communication device, further comprising a receiver configured to receive encoded video data.

25. The apparatus of claim 24, wherein the wireless communication device comprises a telephone handset and wherein the receiver is configured to demodulate, according to a wireless communication standard, a signal comprising the encoded video data.

* * * * *